(12) United States Patent
Yamada et al.

(10) Patent No.: US 10,484,571 B2
(45) Date of Patent: Nov. 19, 2019

(54) MULTIFUNCTION DEVICE, REBOOT METHOD, AND NON-TRANSITORY RECORDING MEDIUM STORING COMPUTER READABLE PROGRAM

(71) Applicant: Konica Minolta, Inc., Tokyo (JP)

(72) Inventors: Masami Yamada, Osaka (JP); Yuji Okamoto, Amagasaki (JP); Katsuhiko Akita, Amagasaki (JP); Kazumi Sawayanagi, Itami (JP); Yasutaka Ito, Amagasaki (JP); Atsushi Tamura, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/059,599

(22) Filed: Aug. 9, 2018

(65) Prior Publication Data

US 2019/0052772 A1 Feb. 14, 2019

(30) Foreign Application Priority Data

Aug. 9, 2017 (JP) .................................. 2017-154049

(51) Int. Cl.
*G06F 3/12* (2006.01)
*H04N 1/333* (2006.01)
*H04N 1/00* (2006.01)

(52) U.S. Cl.
CPC ..... *H04N 1/33369* (2013.01); *H04N 1/00832* (2013.01)

(58) Field of Classification Search
CPC ........... G03G 15/5016; G03G 15/5087; G03G 2215/00109; H04N 1/00384;
(Continued)

(56) References Cited

U.S. PATENT DOCUMENTS

2003/0188115 A1 10/2003 Maezawa
2005/0141020 A1* 6/2005 Harano .................. G06K 15/00
  358/1.15
(Continued)

FOREIGN PATENT DOCUMENTS

CN 103581484 A 2/2014
CN 105988857 A 10/2016
(Continued)

OTHER PUBLICATIONS

Office Action issued in corresponding Chinese Application No. 201810903320.6, dated Aug. 23, 2019 (39 pages).

*Primary Examiner* — Gabriel I Garcia
(74) *Attorney, Agent, or Firm* — Osha Liang LLP

(57) ABSTRACT

A multifunction device integrally includes a first device and a second device. The first device has a first system, and the second system has a second system. The second device requests, in response to a predetermined command entered, a first snapshot of the first device from the first device. The first device generates the first snapshot in response to a request from the second device, and sends the first snapshot to the second device. The second device generates a second snapshot of the second device in response to the predetermined command entered, and saves, to a save destination, the first snapshot sent and the second snapshot. The first device starts the first system by using the first snapshot saved in the save destination. The second device starts the second system by using the second snapshot saved in the save destination.

6 Claims, 25 Drawing Sheets

(58) Field of Classification Search
CPC ........... H04N 1/00832; H04N 1/33369; H04N 1/00411; H04N 2201/0094
USPC .......................................... 358/1.1–1.18, 402
See application file for complete search history.

(56) References Cited

U.S. PATENT DOCUMENTS

| | | | |
|---|---|---|---|
| 2012/0269681 A1* | 10/2012 | Tatsutani | G01N 35/00722 422/67 |
| 2014/0340706 A1* | 11/2014 | Kondo | G06F 3/1253 358/1.15 |
| 2016/0147542 A1 | 5/2016 | Kishi et al. | |
| 2018/0246452 A1* | 8/2018 | Funakawa | H04N 1/00384 |

FOREIGN PATENT DOCUMENTS

| | | |
|---|---|---|
| CN | 106201702 A | 12/2016 |
| JP | 2003-296042 A | 10/2003 |
| JP | 2007-179552 A | 7/2007 |
| JP | 2016-099837 A | 5/2016 |

* cited by examiner

US 10,484,571 B2

MULTIFUNCTION DEVICE, REBOOT METHOD, AND NON-TRANSITORY RECORDING MEDIUM STORING COMPUTER READABLE PROGRAM

The entire disclosure of Japanese Patent Application No. 2017-154049, filed on Aug. 9, 2017, is incorporated herein by reference in its entirety.

BACKGROUND

1. Technological Field

The present invention relates to a technology of a multifunction device that is provided with two devices having separate systems.

2. Description of the Related Art

Recent years have seen the widespread use of image forming apparatuses called "Multi-Functional Peripherals (MFPs)". Such an image forming apparatus has various functions of copying, scanning, faxing, document management, Optical Character Recognition (OCR), and so on.

Further, small computers, e.g., stick personal computers, have recently attained widespread use. Such a computer is small enough to fit in a human hand, and is more applicable to application programs than an image forming apparatus is.

Along with this trend, providing a small built-in computer in an image forming apparatus to extend the functions of the image forming apparatus has been proposed. Such a small computer is hereinafter referred to as an "extended computer". The image forming apparatus has a system (operating system, for example) and the extended computer has a system (operating system, for example). The systems thereof are provided separately from each other.

An application compatible with the extended computer is created more easily than an application compatible with a conventional platform of the image forming apparatus. Further, the application compatible with the extended computer can be developed and distributed not only by a manufacturer of the image forming apparatus but by a user thereof or a third party.

In light of the above, embedding an extended computer in an image forming apparatus enhances the versatility of the image forming apparatus. For example, installing an application for a meeting onto the extended computer enables the image forming apparatus to have a function to share materials with a plurality of users or a function to keep notes by the users.

Meanwhile, in some cases, an image forming apparatus is installed and shared in each facility of a company, government office, or school.

In such a facility, many users use the image forming apparatus one after the other.

For example, a first user uses the image forming apparatus for a meeting, and then, a second user uses the image forming apparatus for making a copy of a document.

In such a case, when the first user stops the meeting temporarily, it is desirable for the first user to keep the state of the image forming apparatus at the time of the stop. However, another user (second user, for example) uses that image forming apparatus in some cases. In light of the shared use of the image forming apparatus, it is desirable to reset the image forming apparatus to the default state.

With this being the situation, it may be possible to use a technology of saving a state of a device to a recording medium such as a hard disk drive and then bringing a state of the device back to the state saved. As the technology of such restoration of a state, the following technologies have been proposed.

According to one of the technologies, an information processing apparatus is provided which has a function of entering a hibernation state and recovering from the hibernation state, and is capable of communicating with a server device for performing apparatus certification. The information processing apparatus includes: storage means for storing a hash value of a started software module in a volatile memory in the case of starting the software module; request means for requesting apparatus certification based on the hash value stored in the volatile memory to the server; and exclusion means for excluding the software module started before entering the hibernation state from the object of the apparatus certification in the case of requesting the apparatus certification after recovering from the hibernation state (English abstract of Japanese Laid-open Patent Publication No. 2016-099837).

According to another one of the technologies, an information processing system holds a common identifier for identifying the condition of this system by a host and a storage device system. Also, the storage device system acquires the set of the data changed by the processing by the host and the data prior to change when the data are changed. Furthermore, this storage device system associates the set of the data with the common identifier, and when a certain identifier is instructed from the host, the storage device system restores the data by using the set of the data with the identifier as a mark (English abstract of Japanese Laid-open Patent Publication No. 2007-179552).

According to still another one of the technologies, a PC is transferred to a hibernation state by performing a specified key operation or the like by a user under a regular OS. The data in the working state immediately therebefore is stored in a HDD. The OS of the hidden partition of the HDD is booted, and a program to perform the dead copy of the HDD is executed. When the dead copy to a backup HDD of the HDD is completed by a copy program, the system of the PC is resumed to boot the regular OS, and the hibernation state is restored to the original state (English abstract of Japanese Laid-open Patent Publication No. 2003-296042).

According to the conventional technologies, however, it is impossible to bring a state of a multifunction device having two devices with separate systems back to a state of the multifunction device at a time when a user stops using the multifunction device temporarily.

SUMMARY

One or more embodiments of the present invention can bring a state of a multifunction device having two devices with separate systems back to a state of the multifunction device at a predetermined point in time more easily than is conventionally possible.

A multifunction device reflecting one or more embodiments of the present invention is a multifunction device integrally including a first device and a second device, the first device having a first system, the second system having a second system separately from the first system; wherein the second device includes a second transmitter configured to request, in response to a predetermined command entered, a first snapshot of the first device from the first device, the first device includes a first computing unit configured to generate the first snapshot in response to a request from the second device, and a first transmitter configured to send the first snapshot generated by the first computing unit to the second device, the second device further includes a second computing unit configured to generate a second snapshot of the second device in response to the predetermined command entered, and a save processing portion configured to save, to a save destination, the first snapshot sent from the first device and the second snapshot generated by the second computing unit, the first device further includes a first boot loader configured to start the first system by using the first snapshot saved in the save destination, and the second device further includes a second boot loader configured to start the second system by using the second snapshot saved in the save destination.

A multifunction device reflecting one or more embodiments of the present invention is a multifunction device integrally including a first device and a second device, the first device having a first system, the second system having a second system separately from the first system; wherein the first device includes a first boot loader configured to start the first system by using a first snapshot of a first compatible device that is compatible with the first device in response to a predetermined command entered into the first compatible device, and the second device includes a second boot loader configured to start the second system by using a second snapshot of a second compatible device that is compatible with the second device in response to the predetermined command entered into the second compatible device.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Hereinafter, embodiments of the present invention will be described with reference to the drawings. However, the scope of the invention is not limited to the disclosed embodiments.

Figure 1:
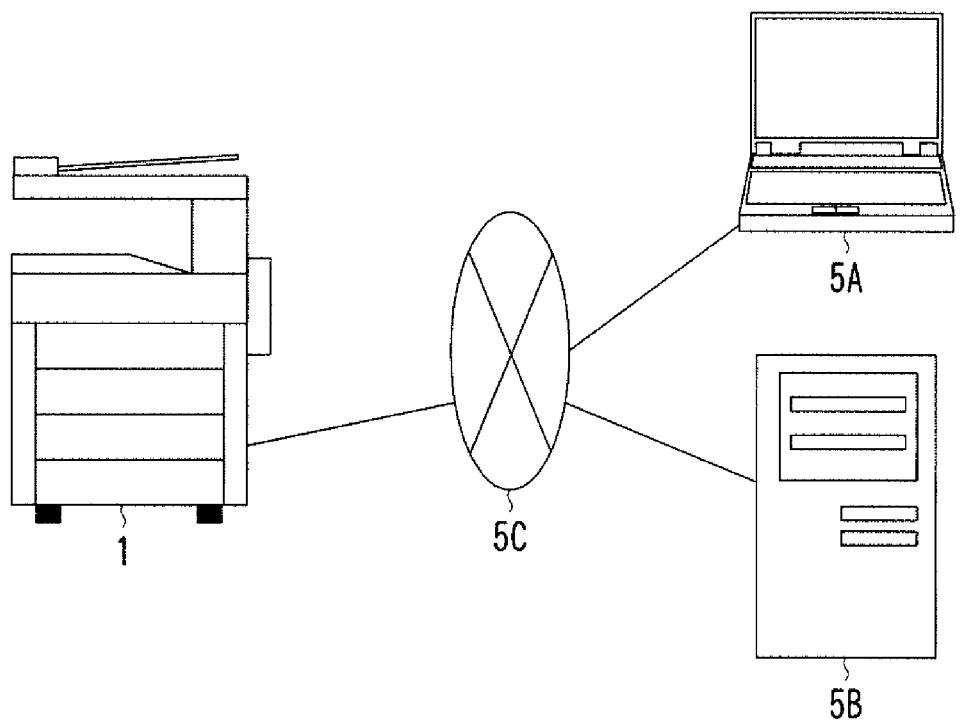
FIG. 1 is a diagram showing an example of the connection of a multifunction device, a terminal, and a server.
Figure 2:
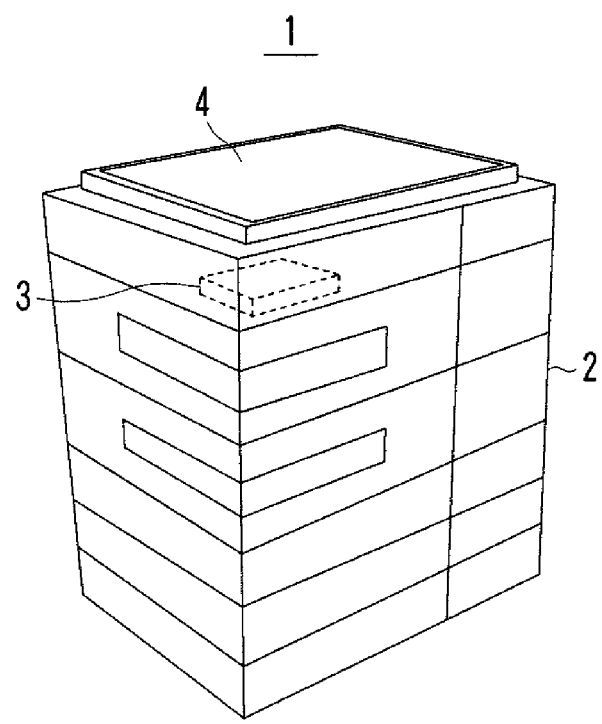
FIG. 2 is an external view showing an example of a multifunction device.
Figure 3:
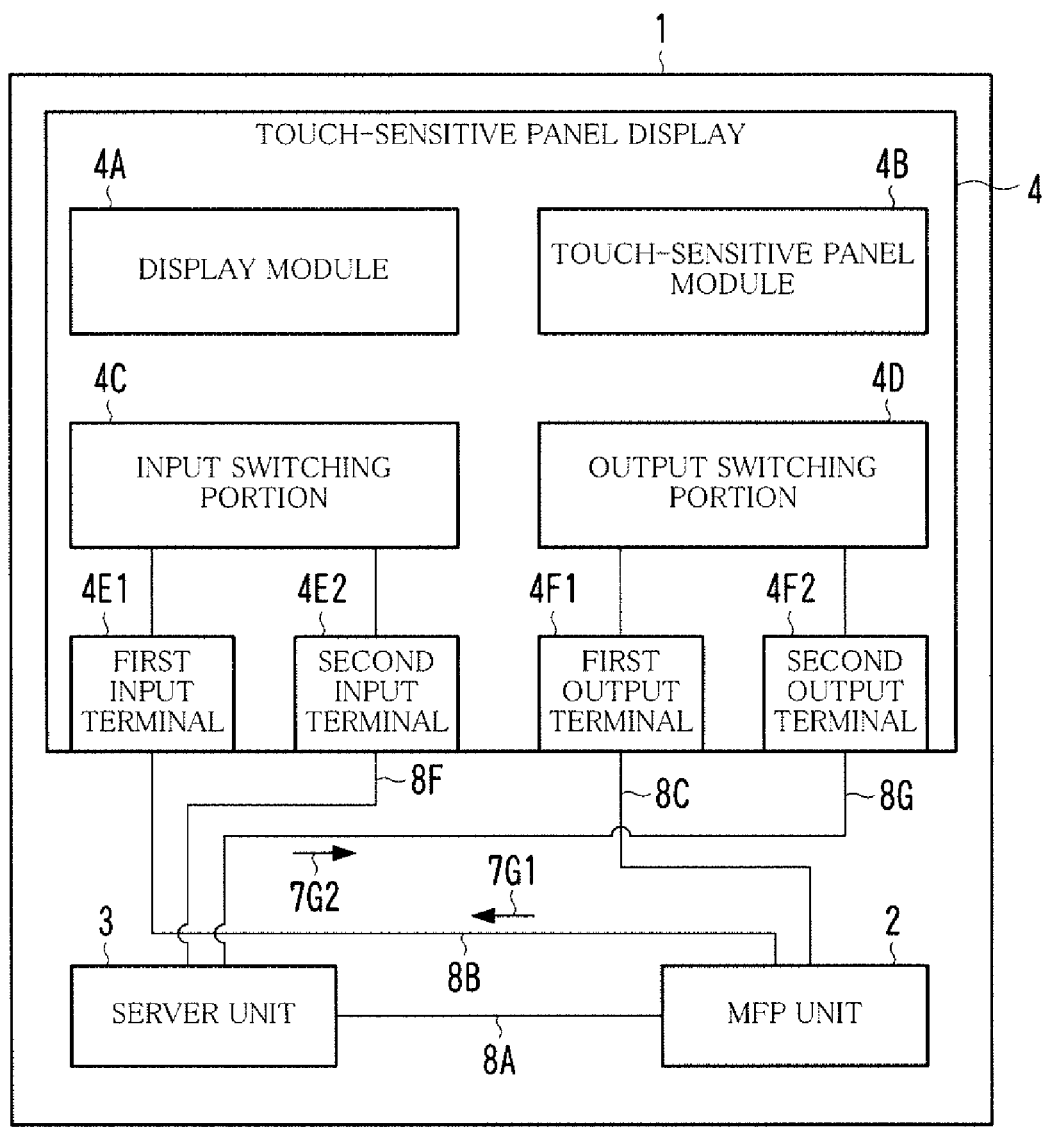
FIG. 3 is a diagram showing an example of the hardware configuration of a multifunction device.
Figure 4:
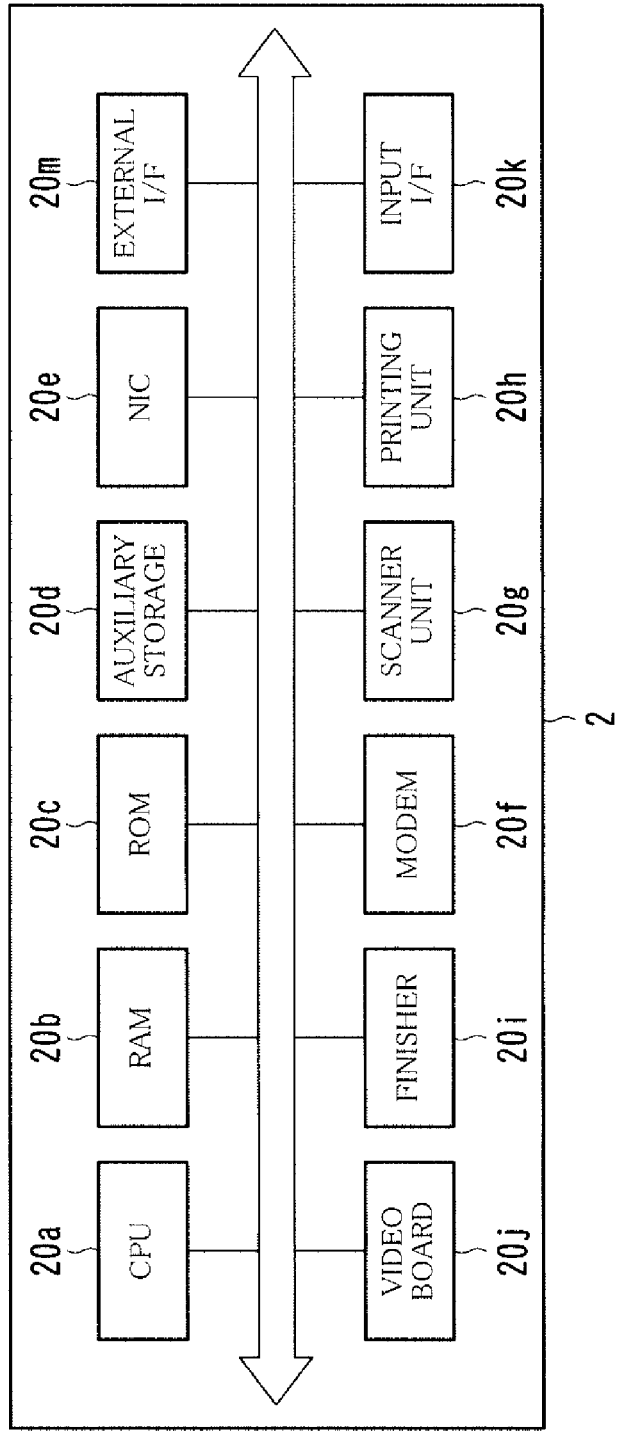
FIG. 4 is a diagram showing an example of the hardware configuration of an MFP unit.
Figure 5:
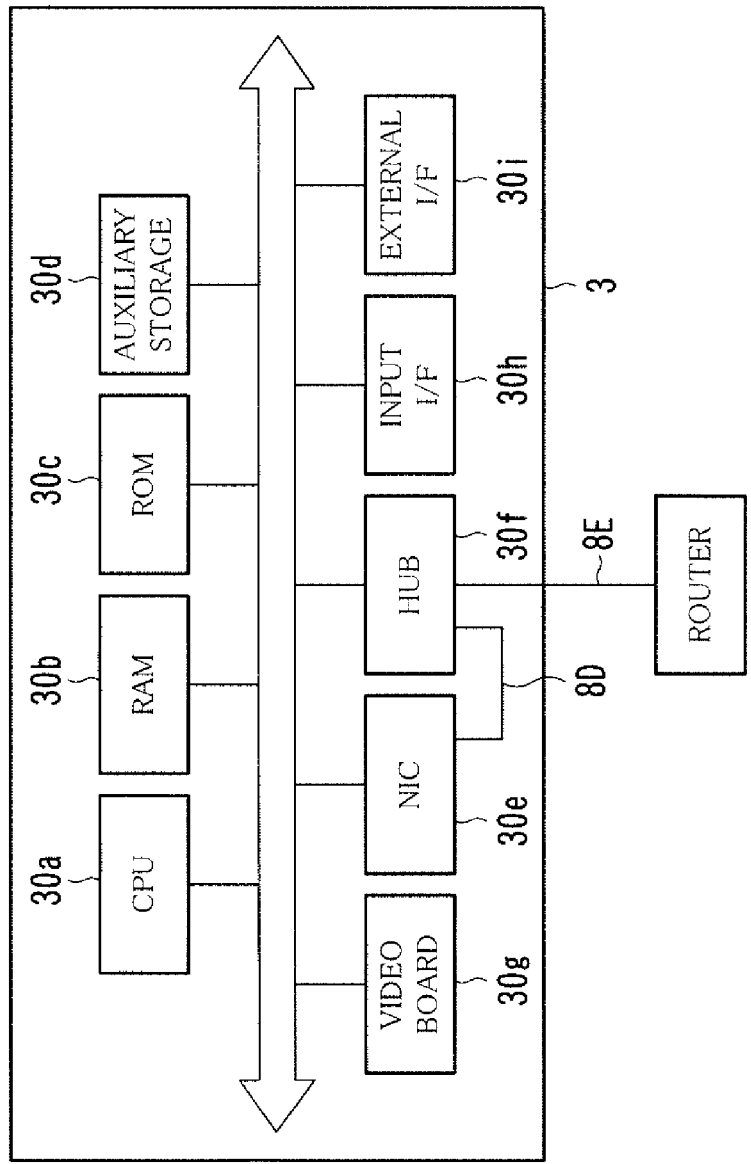
FIG. 5 is a diagram showing an example of the hardware configuration of a server unit.

FIG. 1 is a diagram showing an example of the connection of a multifunction device 1, a terminal 5A, and a server 5B. FIG. 2 is an external view showing an example of the multifunction device 1. FIG. 3 is a diagram showing an example of the hardware configuration of the multifunction device 1. FIG. 4 is a diagram showing an example of the hardware configuration of an MFP unit 2. FIG. 5 is a diagram showing an example of the hardware configuration of a server unit 3.

The multifunction device 1 shown in FIG. 1 is a device into which different functions are incorporated.

The multifunction device 1 is generally called an "image forming apparatus" or a "Multi-Functional Peripheral (MFP)".

The multifunction device 1 is configured to perform communication with the terminal 5A, the server 5B, and so on via a communication line 5C. Examples of the communication line 5C include the Internet, a Local Area Network (LAN), and a public line.

As shown in FIGS. 2 and 3, the multifunction device 1 is configured of the MFP unit 2, the server unit 3, a touch-sensitive panel display 4, and so on.

The MFP unit 2 has functions of copying, PC printing, faxing, scanning, and box function.

The PC printing function is to print an image onto paper based on image data sent from the terminal 5A.

According to the box function, each user is given a storage area called a "box" or a "personal box". The box function enables each user to save image data and so on to his/her storage area and to manage the image data and so on therein. The box corresponds to a "folder" or a "directory" in a personal computer. The box is correlated with an identifier of a user who has been given the subject box. Such an identifier is hereinafter referred to as a "user code".

The server unit 3 is a device that is equivalent to a server machine or a personal computer. The server unit 3 has a function of a web server or a File Transfer Protocol (FTP) server.

The server unit 3 is, for example, an embedded computer. Examples of the embedded computer include Embedded Linux and Windows Embedded. The embedded computer is sometimes called an "embedded computer system" or a "built-in server". The "Linux" and "Windows" are trademarks.

The touch-sensitive panel display 4 is shared by the MFP unit 2 and the server unit 3, so that it displays windows of both the MFP unit 2 and the server unit 3. The touch-sensitive panel display 4 sends data indicating coordinates of a touched location on the surface of the touch panel to the MFP unit 2 or the server unit 3. Such data is hereinafter referred to as "coordinate data".

Referring to FIG. 2, the server unit 3 is built into a casing of the MFP unit 2. The touch-sensitive panel display 4 is provided on the top face of the MFP unit 2. The MFP unit 2, the server unit 3, and the touch-sensitive panel display 4 are integrally formed with one another.

The MFP unit 2, the server unit 3, and the touch-sensitive panel display 4 share the power supply. However, an operating system of the MFP unit 2 and an operating system of the server unit 3 run independently of each other.

The MFP unit 2 and the server unit 3 implement the individual functions to provide a user with a basic service. The functions of the MFP unit 2 and the server unit 3 are combined with one another to provide the user with an applied service.

The processing for displaying a screen in the touch-sensitive panel display 4 is performed basically by the server unit 3. Stated differently, the server unit 3 controls the touch-sensitive panel display 4 so that not only a screen for operating the server unit 3 but a screen for operating the MFP unit 2 are displayed.

The coordinate data is sent from the touch-sensitive panel display 4 via the server unit 3 to the MFP unit 2 even when the coordinate data is basically used for the MFP unit 2. The coordinate data is transferred from the server unit 3 to the MFP unit 2 when the coordinate data is used for the MFP unit 2.

However, when the server unit 3 is down, the touch-sensitive panel display 4 is controlled by the MFP unit 2 without the server unit 3. When the server unit 3 is down, the coordinate data is outputted to the MFP unit 2 not to the server unit 3.

Each of the MFP unit 2 and the server unit 3 has a hibernation function.

The terminal 5A is a client for the user to be given a service of the multifunction device 1. Examples of the terminal 5A include a personal computer, a tablet computer, and a smartphone.

The server 5B saves a file therein. In response to a request from the multifunction device 1, the server 5B provides the multifunction device 1 with a file saved therein appropriately. Examples of the server 5B include a file server and a cloud server. Hereinafter, a case is described in which the server 5B is a cloud server. The server 5B has directories on a user-by-user basis.

Referring to FIG. 4, the MFP unit 2 is configured of a Central Processing Unit (CPU) 20a, a Random Access Memory (RAM) 20b, a Read Only Memory (ROM) 20c, an auxiliary storage 20d, a Network Interface Card (NIC) 20e, a modem 20f, a scanner unit 20g, a printing unit 20h, a finisher 20i, a video board 20j, an input interface 20k, an external interface 20m, and so on.

The NIC 20e is connected to a hub 30f (see FIGS. 5, 15, 18, 22, and 23) of the server unit 3 via a cable 8A. The NIC 20e is configured to perform communication with the server unit 3 via the hub 30f in accordance with a protocol such as Transmission Control Protocol/Internet Protocol (TCP/IP). The NIC 20e is configured to perform communication via the hub 30f with a device that is external to the multifunction device 1, e.g., the terminal 5A or the server 5B.

The modem 20f sends/receives image data with a facsimile terminal in accordance with a protocol such as G3.

The scanner unit 20g optically reads an image on a sheet of paper placed on a platen glass to generate image data thereof.

The printing unit 20h prints, onto paper, an image read out by the scanner unit 20g or an image depicted in image data received from another device.

The finisher 20i applies a post-process, if necessary, to a printed matter obtained by the printing unit 20h. The post-process includes stapling the printed matter with a stapler, punching a hole in the printed matter, and folding the printed matter.

The video board 20j is connected to a first input terminal 4E1 (see FIG. 3) of the touch-sensitive panel display 4 via a cable 8B. The video board 20j generates, as screen data, screen data 7G1 to send the screen data 7G1 to the touch-sensitive panel display 4. The "screen data" is a video signal for displaying an image. The video board 20j is sometimes called a "graphics board", a "video card", or the like.

Examples of an interface of the video board 20j and the first input terminal 4E1 include High-Definition Multimedia Interface (HDMI) (registered trademark) and D-Subminiature (D-SUB). The same is similarly applied to an interface of a video board 30g and a second input terminal 4E2.

The input interface 20k is connected to a first output terminal 4F1 of the touch-sensitive panel display 4 via a cable 8C. The input interface 20k receives coordinate data from the touch-sensitive panel display 4.

The input interface 20k and an interface of the first output terminal 4F1 may be Institute of Electrical and Electronics Engineers (IEEE) 1394 or Universal Serial Bus (USB).

The external interface 20m is an interface to perform communication with an external device such as a portable storage. Hereinafter, an example is described in which the external interface 20m is a USB interface.

The CPU 20a is the main CPU of the MFP unit 2. The RAM 20b is the main memory of the MFP unit 2. Examples of the RAM 20b include an SDRAM such as a Double Data Rate Secure Digital Synchronous Dynamic Random Access Memory (DDR-SDRAM). The same is true with a RAM 30b (see FIG. 5) described later.

Figure 6:
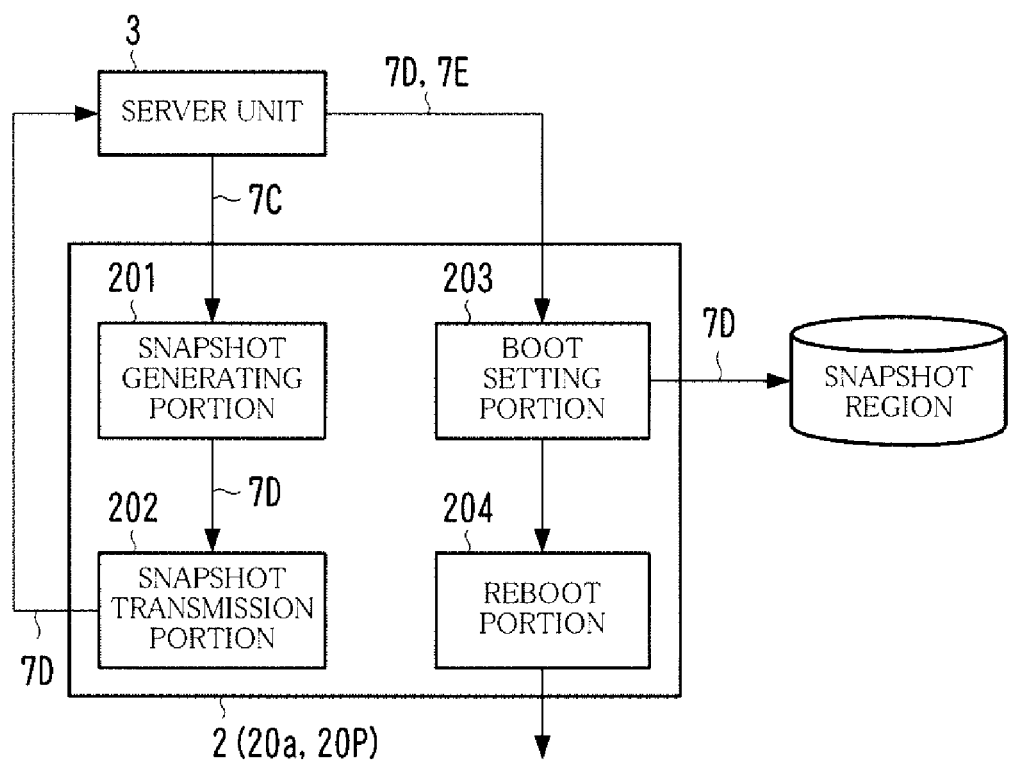
FIG. 6 is a diagram showing an example of the functional configuration of an MFP unit.

The ROM 20c or the auxiliary storage 20d stores, therein, an operating system, an application for implementing the foregoing functions such as copying, an application for providing service, and a program such as a snapshot program 20P (see FIG. 6).

The programs are loaded into the RAM 20b, and are executed by the CPU 20a. Examples of the auxiliary storage 20d include a hard disk drive and a Solid State Drive (SSD).

Referring to FIG. 5, the server unit 3 is configured of a CPU 30a, the RAM 30b, a ROM 30c, an auxiliary storage 30d, an NIC 30e, the hub 30f, the video board 30g, an input interface 30h, an external interface 30i, and so on.

The NIC 30e is connected to the hub 30f via a cable 8D. The NIC 30e performs communication via the hub 30f with the MFP unit 2 and a device external to the multifunction device 1 in accordance with a protocol such as TCP/IP.

The hub 30f is connected to the NIC 30e via the cable 8D and to the NIC 20e of the MFP unit 2 via the cable 8A as described above. The hub 30*f* is also connected to a router via a cable 8E. The hub 30*f* relays data sent/received between these units.

The video board 30*g* is connected to the second input terminal 4E2 (see FIG. 3) of the touch-sensitive panel display 4 via a cable 8F. The video board 30*g* generates screen data 7G2 to send the same to the touch-sensitive panel display 4.

The input interface 30*h* is connected to a second output terminal 4F2 of the touch-sensitive panel display 4 via a cable 8G. The input interface 30*h* receives coordinate data from the touch-sensitive panel display 4.

As with the external interface 20*m* of the MFP unit 2, the external interface 30*i* is to perform communication with an external device such as a portable storage, e.g., a USB memory.

The CPU 30*a* is the main CPU of the server unit 3. The RAM 30*b* is the main memory of the server unit 3.

The ROM 30*c* or the auxiliary storage 30*d* stores, therein, the operating system, an application program for implementing the foregoing functions, an application program for providing a service, and so on. The ROM 30*c* or the auxiliary storage 30*d* also stores, therein, a meeting program 30P and an operation maintaining program 30Q (see FIG. 7).

The meeting program 30P is to support a meeting process. The meeting program 30P enables displaying meeting materials in the touch-sensitive panel display 4. The meeting program 30P also enables making a record, as a memorandum, of an image written by the user in the touch-sensitive panel display 4. The meeting program 30P is favorably used, particularly in a meeting which is held with the users surrounding the multifunction device 1. It is possible that the meeting program 30P is a commercial application.

Suppose that the user suspends the meeting and stops using the multifunction device 1. In such a case, when the user resumes the meeting later, the operation maintaining program 30Q enables the multifunction device 1 to be brought back to the state where he/she left off more easily than is conventionally possible, so that the user can use the multifunction device 1.

The auxiliary storage 30*d* has a snapshot region in which to store a snapshot as described later.

The programs are loaded into the RAM 30*b*, and executed by the CPU 30*a*. Examples of the auxiliary storage 30*d* include a hard disk drive and an SSD.

Referring to FIG. 3, the touch-sensitive panel display 4 is configured of a display module 4A, a touch-sensitive panel module 4B, an input switching portion 4C, an output switching portion 4D, the first input terminal 4E1, the second input terminal 4E2, the first output terminal 4F1, the second output terminal 4F2, and so on.

The first input terminal 4E1 is connected to the video board 20*j* of the MFP unit 2 via the cable 8B. The first input terminal 4E1 receives an input of the screen data 7G1 from the video board 20*j*. The second input terminal 4E2 is connected to the video board 30*g* of the server unit 3 via the cable 8F. The second input terminal 4E2 receives an input of the screen data 7G2 from the video board 30*g*.

The input switching portion 4C sends, to the display module 4A, any one of the screen data 7G1 and the screen data 7G2 in the following manner.

When only any one of the screen data 7G1 and the screen data 7G2 is inputted, the input switching portion 4C sends, to the display module 4A, the screen data 7G1 or 7G2 thus inputted.

Thereafter, when inputting the other screen data of the screen data 7G1 and 7G2 is started, the input switching portion 4C starts sending, to the display module 4A, the screen data 7G1 or 7G2 that has started being inputted.

For example, when inputting the screen data 7G2 from the second input terminal 4E2 is started, the input switching portion 4C starts sending the screen data 7G2 to the display module 4A. Thereafter, when inputting the screen data 7G1 from the first input terminal 4E1 is started, the input switching portion 4C stops sending the screen data 7G2 to the display module 4A, and starts sending the screen data 7G1 to the display module 4A.

The display module 4A serves to display a screen based on the screen data 7G1 or 7G2 sent by the input switching portion 4C. Examples of the display module 4A include a flat panel display such as an organic Electro Luminescence (EL) display or a liquid crystal display.

The touch-sensitive panel module 4B sends, to the output switching portion 4D, data indicating coordinates of a touched location in response to a touch surface touched. Such data is hereinafter referred to as "coordinate data".

When receiving the coordinate data from the touch-sensitive panel module 4B, the output switching portion 4D sends the coordinate data to any one of the first output terminal 4F1 and the second output terminal 4F2 in the following manner.

Where the input switching portion 4C already sends, to the display module 4A, the screen data to be inputted to the first input terminal 4E1, namely, the screen data 7G1, the output switching portion 4D sends the coordinate data to the first output terminal 4F1. In contrast, where the input switching portion 4C already sends, to the display module 4A, the screen data to be inputted to the second input terminal 4E2, namely, the screen data 7G2, the output switching portion 4D sends the coordinate data to the second output terminal 4F2.

The first output terminal 4F1 is connected to the input interface 20*k* of the MFP unit 2 via the cable 8C. The first output terminal 4F1 outputs the coordinate data sent by the output switching portion 4D to the input interface 20*k*.

The second output terminal 4F2 is connected to the input interface 30*h* of the server unit 3 via the cable 8G. The second output terminal 4F2 outputs the coordinate data sent by the output switching portion 4D to the input interface 30*h*.

Figure 7:
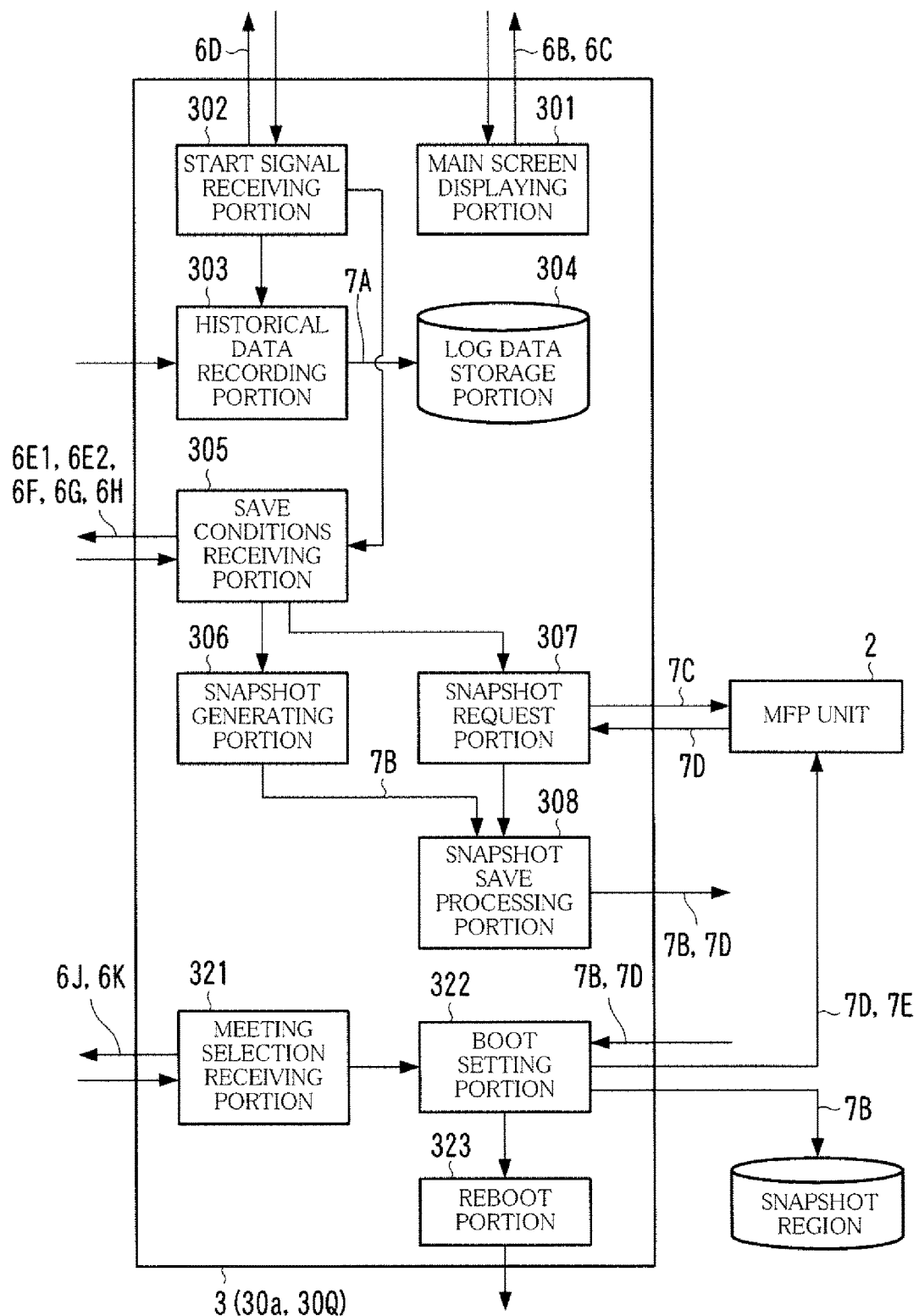
FIG. 7 is a diagram showing an example of the functional configuration of a server unit.
Figure 8:
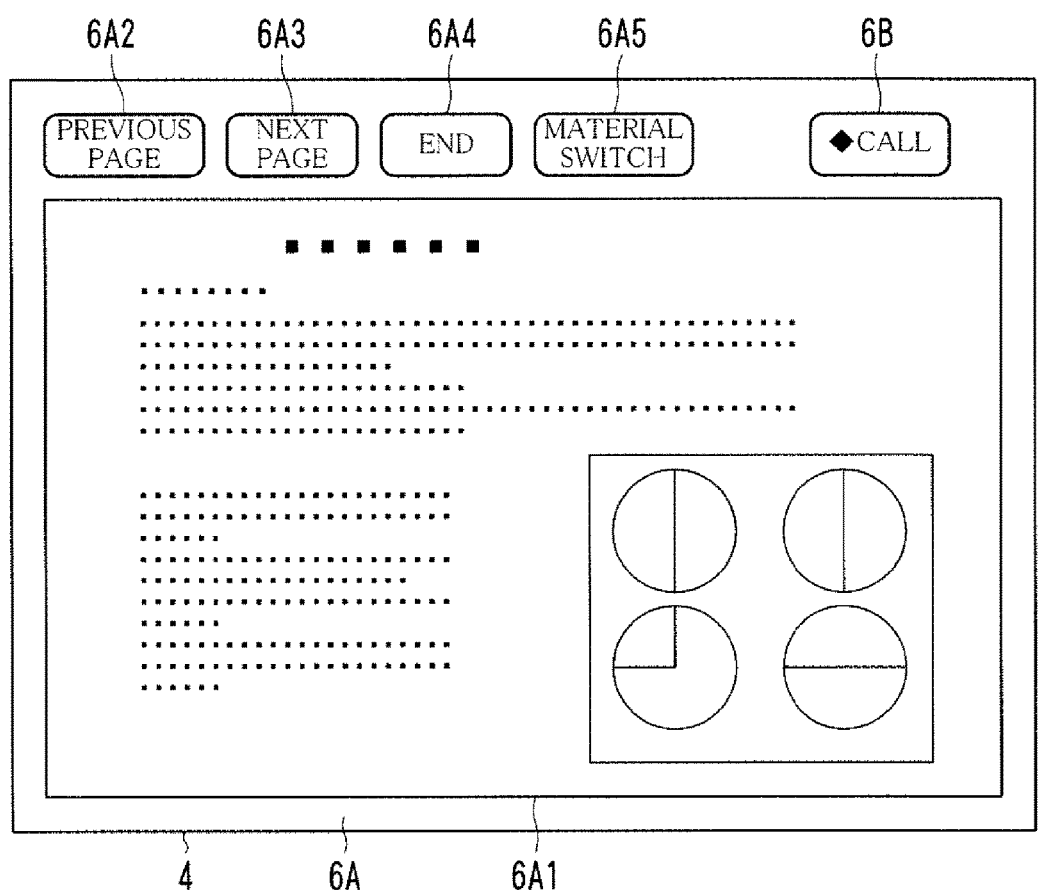
FIG. 8 is a diagram showing an example of a material view screen and a call command button.
Figure 9:
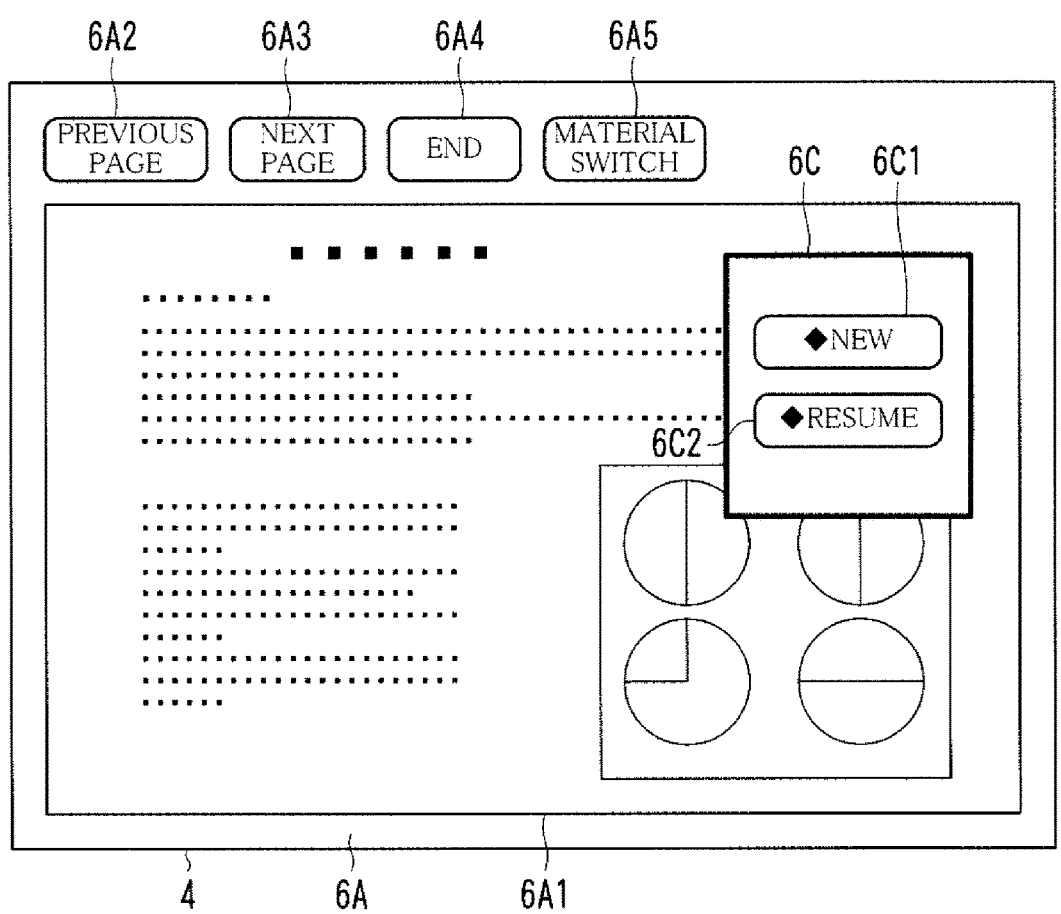
FIG. 9 is a diagram showing an example of a material view screen and a main screen.
Figure 10:
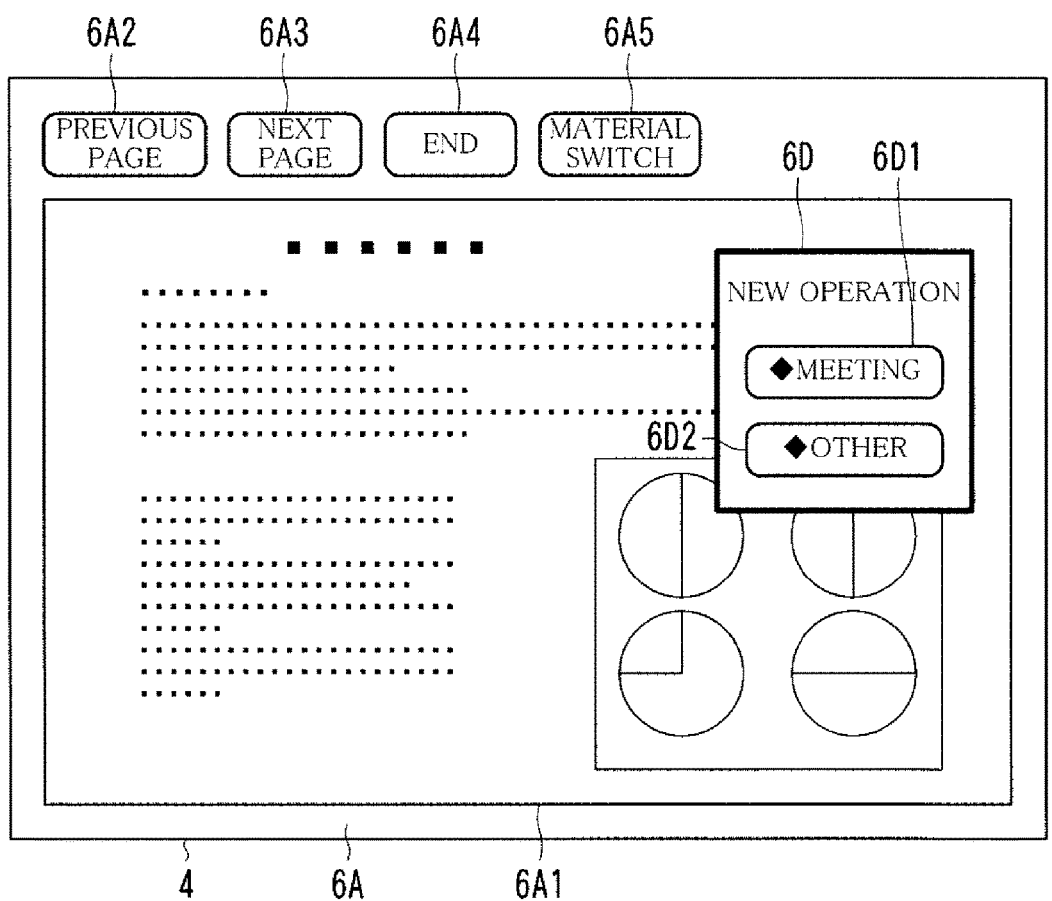
FIG. 10 is a diagram showing an example of a material view screen and an operation list screen.
Figure 11:
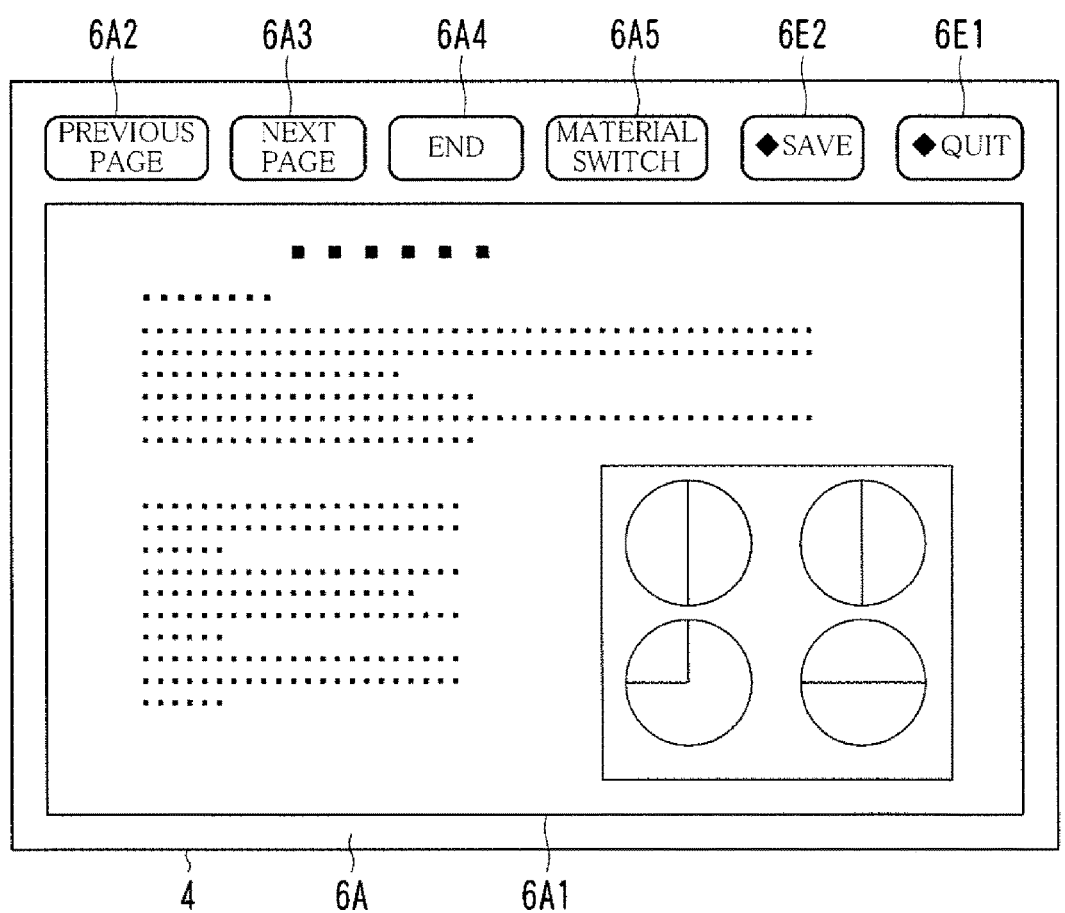
FIG. 11 is a diagram showing an example of a material view screen, a quit command button, and a save command button.
Figure 12:
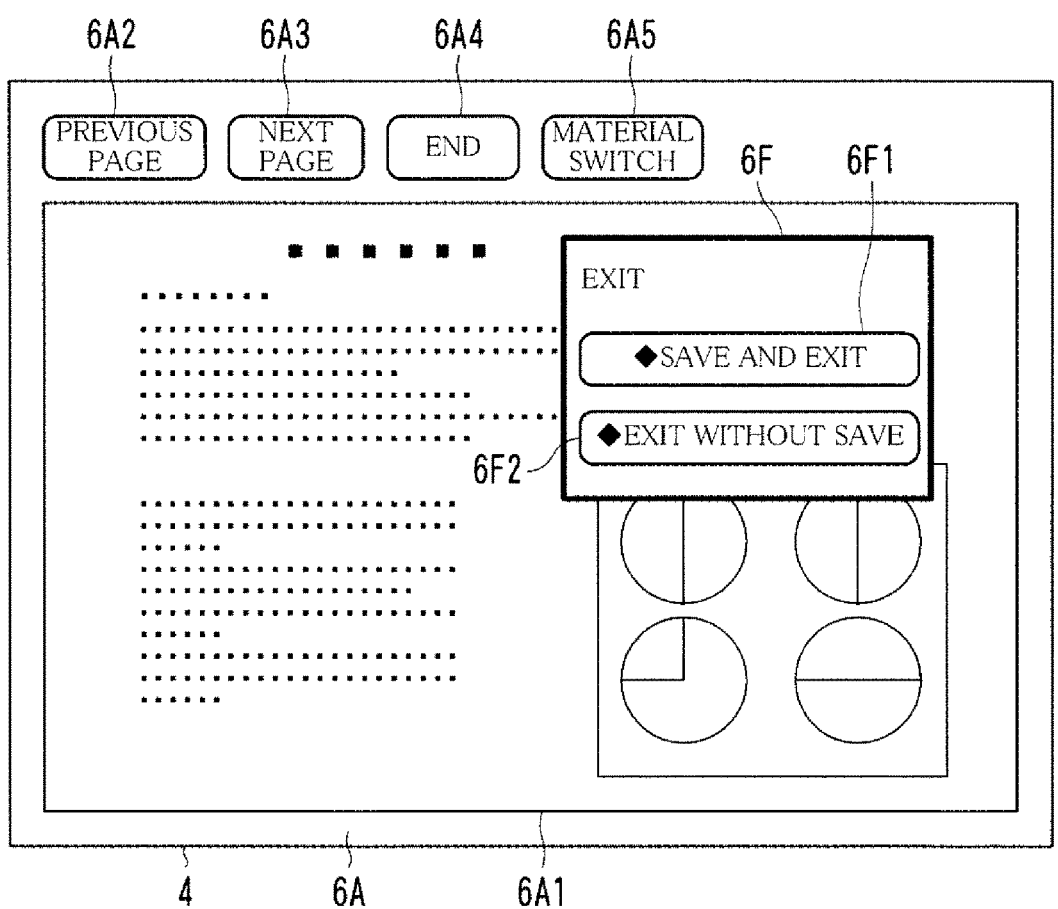
FIG. 12 is a diagram showing an example of a material view screen and a save necessity selection screen.
Figure 13:
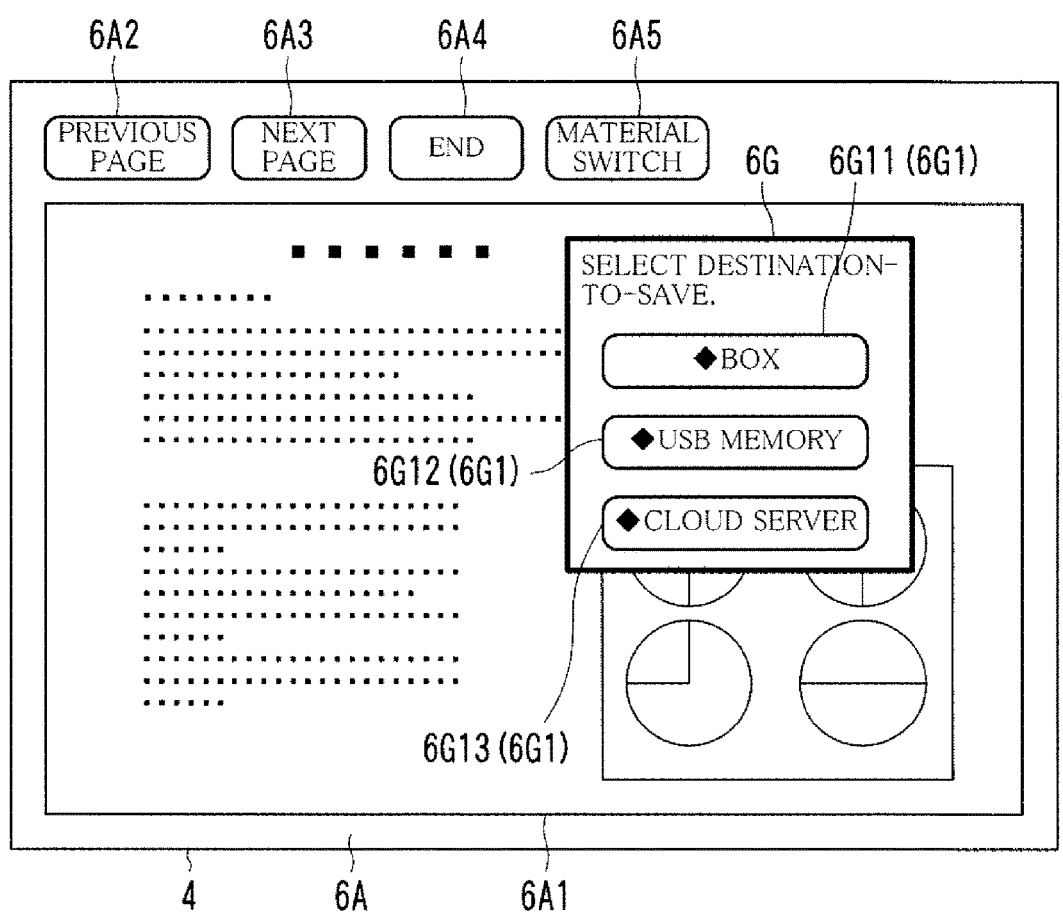
FIG. 13 is a diagram showing an example of a material view screen and a destination-to-save selection screen.
Figure 14:
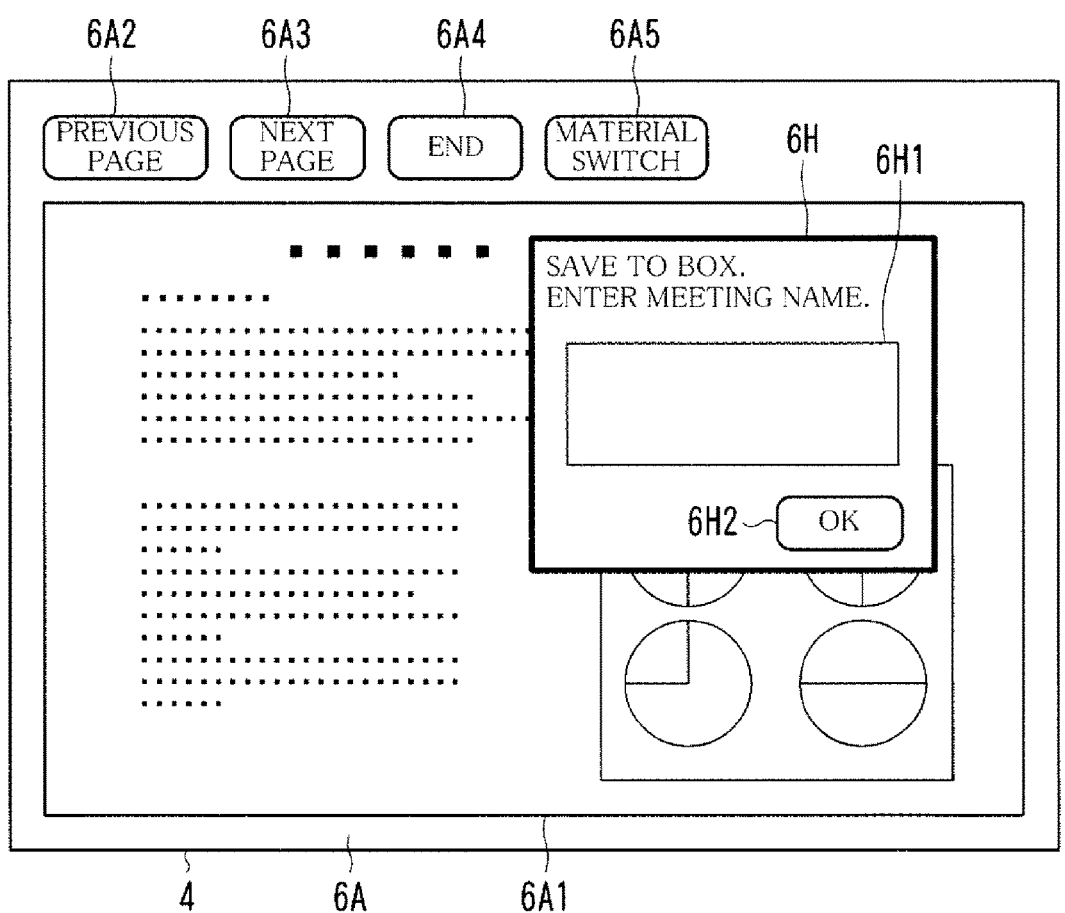
FIG. 14 is a diagram showing an example of a material view screen and a name entry screen.
Figure 15:
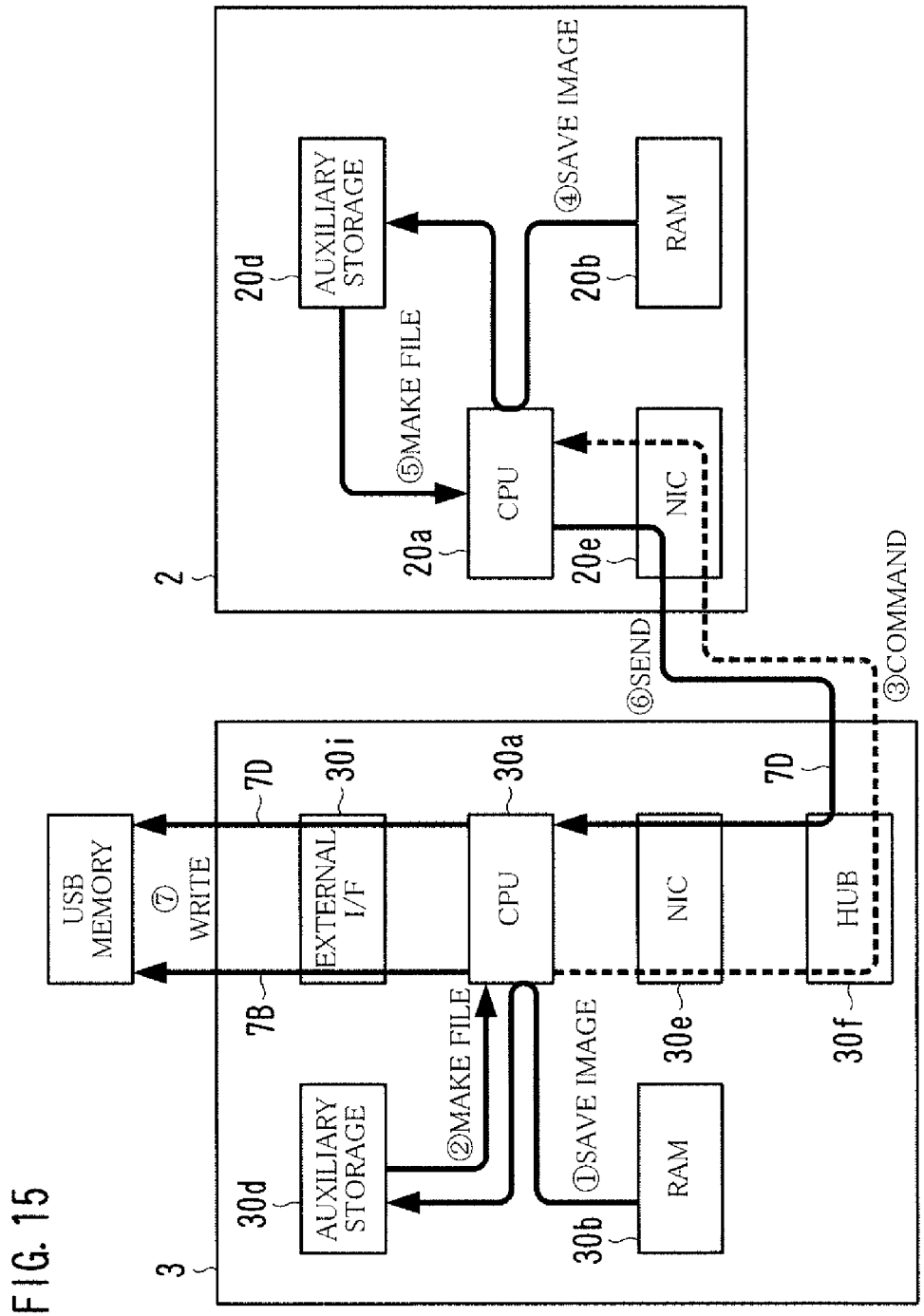
FIG. 15 is a diagram showing an example of the flow of data at the time of generation of a snapshot.
Figure 16:
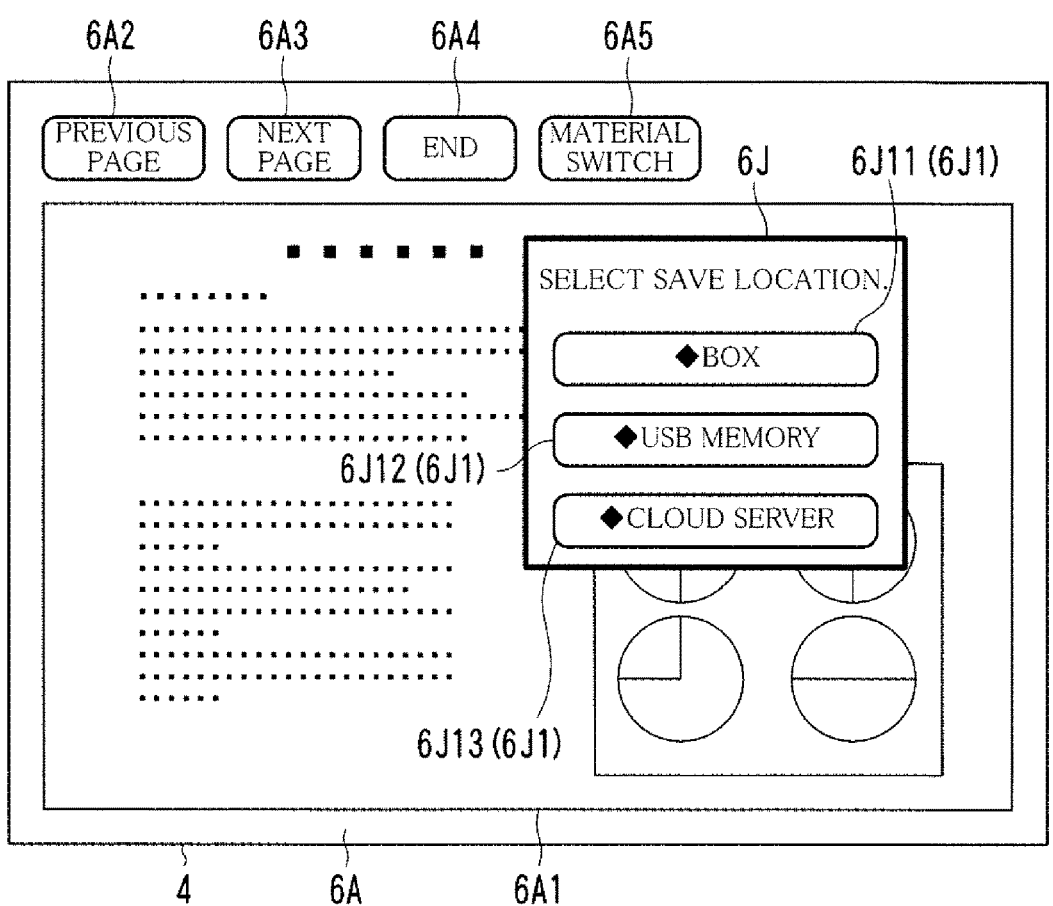
FIG. 16 is a diagram showing an example of a material view screen and a location selection screen.
Figure 17:
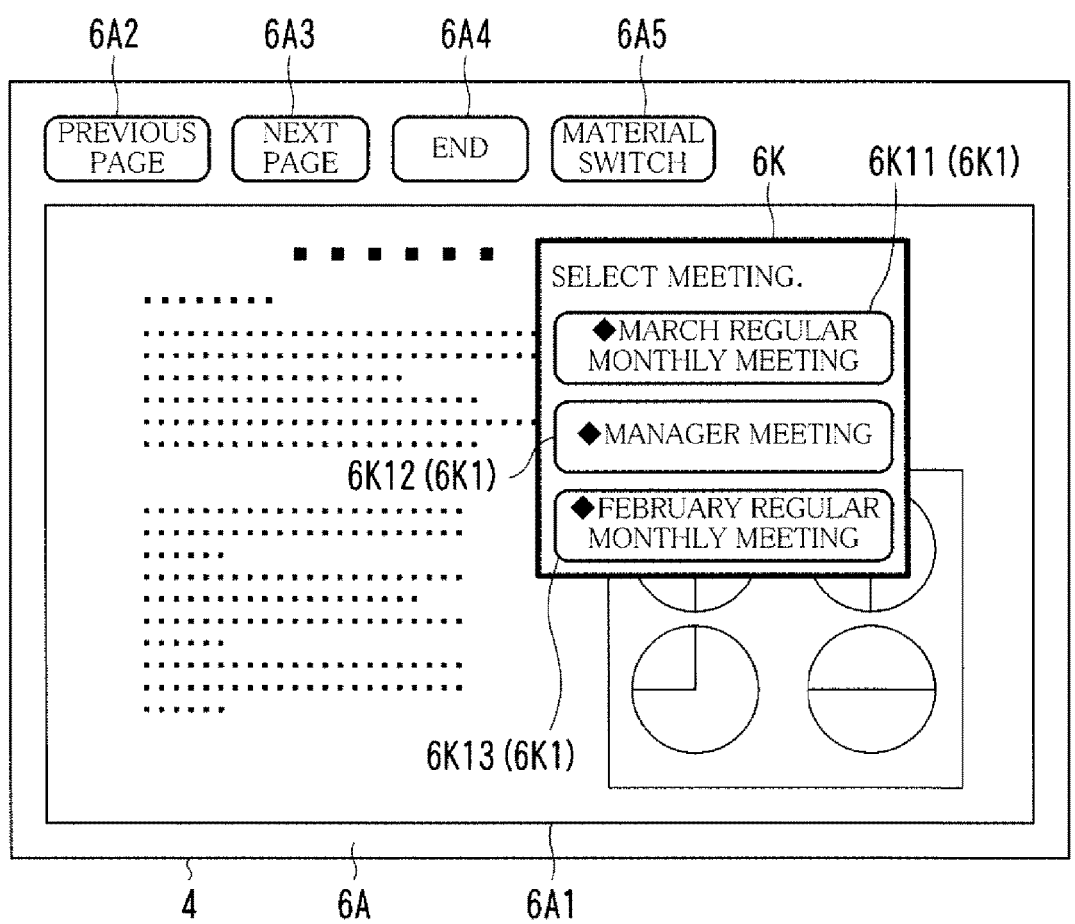
FIG. 17 is a diagram showing an example of a material view screen and a meeting selection screen.
Figure 18:
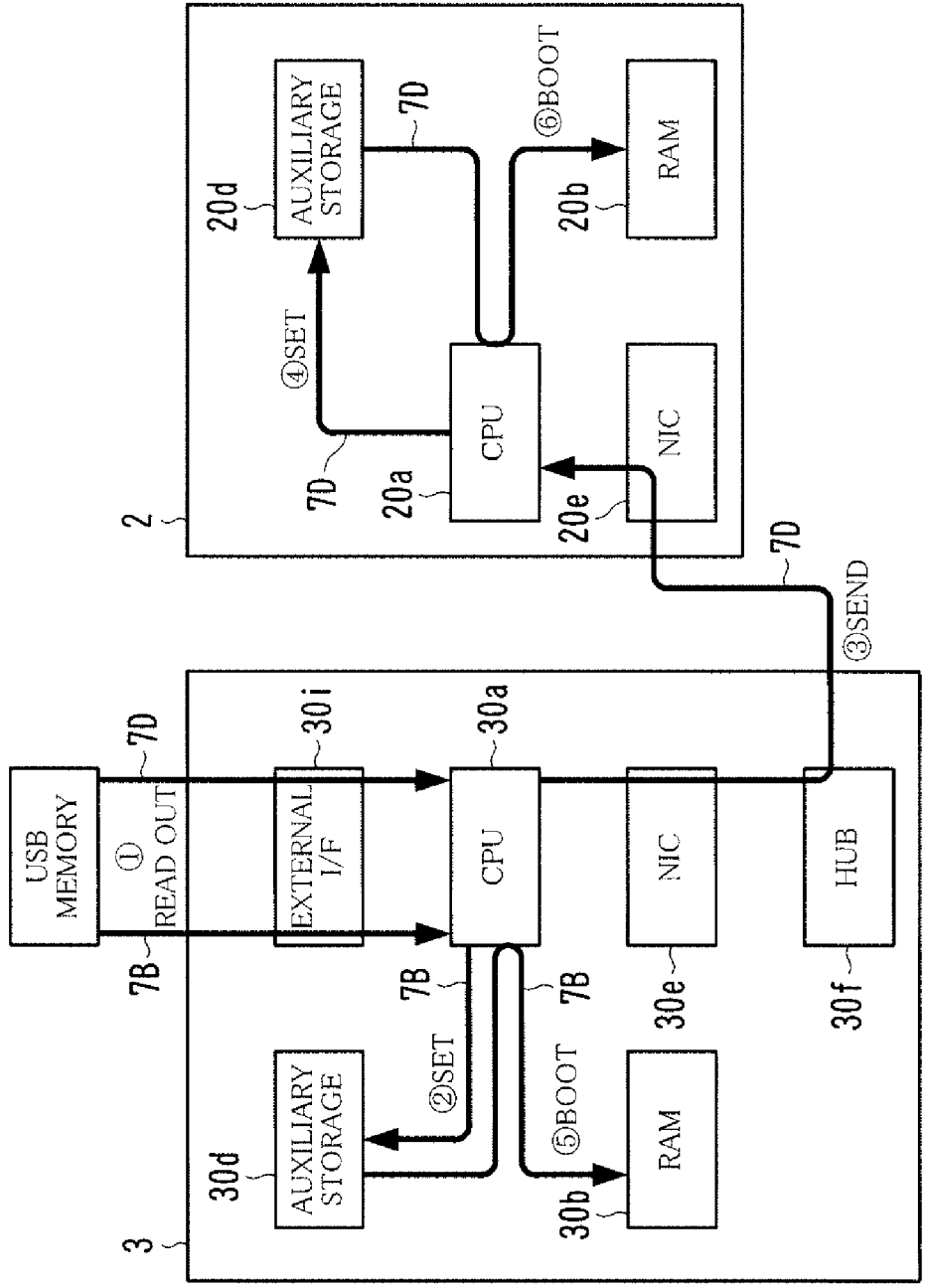
FIG. 18 is a diagram showing an example of the flow of data at the time of reboot.

FIG. 6 is a diagram showing an example of the functional configuration of the MFP unit 2. FIG. 7 is a diagram showing an example of the functional configuration of the server unit 3. FIG. 8 is a diagram showing an example of a material view screen 6A and a call command button 6B. FIG. 9 is a diagram showing an example of the material view screen 6A and a main screen 6C. FIG. 10 is a diagram showing an example of the material view screen 6A and an operation list screen 6D. FIG. 11 is a diagram showing an example of the material view screen 6A, a quit command button 6E1, and a save command button 6E2. FIG. 12 is a diagram showing an example of the material view screen 6A and a save necessity selection screen 6F. FIG. 13 is a diagram showing an example of the material view screen 6A and a destination-to-save selection screen 6G. FIG. 14 is a diagram showing an example of the material view screen 6A and a name entry screen 6H. FIG. 15 is a diagram showing an example of the flow of data at the time of generation of a snapshot. FIG. 16 is a diagram showing an example of the material view screen 6A and a location selection screen 6J. FIG. 17 is a diagram showing an example of the material view screen 6A and a meeting selection screen 6K. FIG. 18 is a diagram showing an example of the flow of data at the time of reboot.

The description goes on to the functions implemented, in the MFP unit 2, by the snapshot program 20P and the like, and the functions implemented, in the server unit 3, by the operation maintaining program 30Q and the like. The description is provided with reference to FIGS. 6-18, for example.

The snapshot program 20P implements, in the MFP unit 2, a snapshot generating portion 201, a snapshot transmission portion 202, a boot setting portion 203, a reboot portion 204, and so on, all of which are shown in FIG. 6.

The operation maintaining program 30Q implements, in the server unit 3, a main screen displaying portion 301, a start signal receiving portion 302, a historical data recording portion 303, a log data storage portion 304, a save conditions receiving portion 305, a snapshot generating portion 306, a snapshot request portion 307, a snapshot save processing portion 308, a meeting selection receiving portion 321, a boot setting portion 322, a reboot portion 323, and so on, all of which are shown in FIG. 7.

Before starting a meeting, the user logs into the server unit 3 to launch the meeting program 30P in the server unit 3. If the multifunction device 1 is powered off, the user turns on the multifunction device 1 to start the operating systems of the MFP unit 2 and the server unit 3. The user then logs into the server unit 3 to launch the meeting program 30P in the server unit 3.

The user also launches the operation maintaining program 30Q in the server unit 3. It is possible to configure the meeting program 30P so that, in response to the start of the meeting program 30P, the operation maintaining program 30Q automatically starts. Alternatively, it is also possible to prepare a program that starts concurrently both the meeting program 30P and the operation maintaining program 30Q, and to execute the program to start the meeting program 30P and the operation maintaining program 30Q.

In response to the meeting program 30P starting, different screens are displayed in the touch-sensitive panel display 4 in accordance with user operation. For example, the material view screen 6A as that shown in FIG. 8 is displayed in the touch-sensitive panel display 4. The material view screen 6A is a screen for the user to view a material containing pages one by one. The material view screen 6A has a material region 6A1, a previous page button 6A2, a next page button 6A3, an end button 6A4, and a material switch button 6A5.

Any one page of the material appears in the material region 6A1. At a time when the material view screen 6A is displayed, the default page, e.g., Page 1, appears.

The user touches any location in the material region 6A1 of the material view screen 6A to make a memorandum into the page appearing in the material region 6A1. The memorandum is saved in the form of an electronic file (hereinafter, referred to simply as a "file") to the auxiliary storage 30d or a recording medium connected to the external interface 30i. The user touches the previous page button 6A2 or the next page button 6A3 to change the page appearing in the material region 6A1 to another page.

However, according to one or more embodiments the user may perform, before starting a new meeting or before resuming the suspended meeting, operation as described below.

When the operation maintaining program 30Q is launched, the main screen displaying portion 301 displays the call command button 6B in a screen for the meeting program 30P. As shown in FIG. 8, the call command button 6B is displayed in the material view screen 6A, for example. In response to the call command button 6B touched, the main screen displaying portion 301 displays the main screen 6C as shown in FIG. 9 instead of the call command button 6B.

The call command button 6B is displayed in a blank area of the screen for the meeting program 30P. The same applies to the quit command button 6E1 and the save command button 6E2 (see FIG. 11) described later.

The main screen 6C has two buttons disposed therein. The buttons are a new button 6C1 and a resume button 6C2.

When starting a new meeting, the user touches the call command button 6B to display the main screen 6C, and then touches the new button 6C1. In response to the user operation, the start signal receiving portion 302 performs processing for receiving a start signal of the new meeting in the manner discussed below.

In response to the new button 6C1 touched, the start signal receiving portion 302 displays the operation list screen 6D, instead of the main screen 6C, in the touch-sensitive panel display 4 as shown in FIG. 10. For start of the new meeting, the user touches a meeting button 6D1.

The start signal receiving portion 302 recognizes that the meeting button 6D1 has been touched, and thereby, receives the start signal of the new meeting. The user touches the meeting button 6D1 to start the meeting. In response to the meeting button 6D1 touched, the start signal receiving portion 302 finishes displaying the operation list screen 6D.

In the meeting, the user can make a memorandum in the form of an electronic file as described above. The user is also allowed to use services provided by the MFP unit 2 appropriately. For example, the user is allowed to use a service of printing, onto paper, a material displayed in the touch-sensitive panel display 4. The user is also allowed to use a service of scanning another material to paste the resultant to a material displayed in the touch-sensitive panel display 4.

In using the services by the MFP unit 2, the user is allowed to make settings regarding various conditions for printing or scanning.

In response to a service of the MFP unit 2 used, the historical data recording portion 303 generates log data 7A to store the same into the log data storage portion 304. In short, the historical data recording portion 303 performs processing for recording historical data on the services by the MFP unit 2.

The log data 7A indicates an identifier of the used service, e.g., a service name of the used service, conditions set when the service is provided, a user code of the user, and a date and time at which the service has been used.

After the meeting button 6D1 is touched, the save conditions receiving portion 305 performs processing for receiving conditions regarding save of data that is necessary to restore the state of the multifunction device 1 at a time when the meeting has been suspended. The necessary data corresponds to snapshot 7B and snapshot 7D described later. The processing is performed as follows.

When the user touches the meeting button 6D1, the save conditions receiving portion 305 displays the quit command button 6E1 and the save command button 6E2 in the touch-sensitive panel display 4 as shown in FIG. 11.

In order to suspend the meeting, the user performs operation as discussed below. The operation enables the multifunction device 1 to prepare for restoration to the state of the multifunction device 1 at a time when the meeting has been suspended.

The user touches the quit command button 6E1. In response to the touch, the save conditions receiving portion 305 displays, instead of the quit command button 6E1 and the save command button 6E2, the save necessity selection screen 6F in the touch-sensitive panel display 4 as shown in FIG. 12.

When the user touches a save and exit button 6F1 of the save necessity selection screen 6F, the save conditions receiving portion 305 displays, instead of the save necessity selection screen 6F, the destination-to-save selection screen 6G in the touch-sensitive panel display 4 as shown in FIG. 13.

The destination-to-save selection screen 6G has select buttons 6G1 for destinations to which the snapshot 7B and the snapshot 7D can be saved. In one or more embodiments, the select buttons 6G1 include a button 6G11 to select a box, a button 6G12 to select a USB memory, and a button 6G13 to select a cloud server.

That "box" means a box of a user who logs in the server unit 3. To be specific, that "box" means a box, which is provided in the MFP unit 2, corresponding to a user code of the user.

That "USB memory" means a USB memory that is connected to the external interface 30i and is recognized by the operating system of the server unit 3.

That "cloud server" means a directory, which is provided in the server 5B, of the user.

The user selects a destination to which the snapshot 7B and the snapshot 7D are to be saved by touching one of the select buttons 6G1 corresponding to the destination.

In response to the selection, the save conditions receiving portion 305 receives the destination selected by the user as a destination (destination-to-save) to which the snapshot 7B and the snapshot 7D are to be saved. As shown in FIG. 14, the save conditions receiving portion 305 displays, instead of the select buttons 6G1, the name entry screen 6H in the touch-sensitive panel display 4.

The user enters the name of the meeting to be suspended in a text box 6H1 of the name entry screen 6H. The name is used to identify a set of the snapshot 7B and the snapshot 7D. The user then touches an OK button 6H2.

In response to the touch, the save conditions receiving portion 305 receives the entered name as information to identify a set of the snapshot 7B and the snapshot 7D. The save conditions receiving portion 305 then finishes displaying the name entry screen 6H.

In response to the OK button 6H2 touched, processing for generating the snapshot 7B and the snapshot 7D is performed, for example, in the manner as shown in FIG. 15.

The snapshot generating portion 306 generates, as the snapshot 7B, a file representing the current state of the server unit 3. To be specific, the snapshot generating portion 306 saves, to the auxiliary storage 30d, the programs and data developed on (loaded to) the RAM 30b and the data stored in the register of the CPU 30a (encircled number 1 of FIG. 15). The snapshot generating portion 306 then makes a file of the programs and data (encircled number 2). The file corresponds to the snapshot 7B. The file is sometimes called an "image file", a "snapshot dump", or the like.

Saving the programs and data from the RAM 30b to the auxiliary storage 30d may be performed by Direct Memory Access (DMA). Alternatively, making the file may be performed without saving the programs and data to the auxiliary storage 30d. The same is similarly applied to a case of generating the snapshot 7D.

The snapshot request portion 307 requests a snapshot from the MFP unit 2 (encircled number 3). At this time, the snapshot request portion 307 sends request data 7C to the MFP unit 2.

With the MFP unit 2, the snapshot generating portion 201 receives the request data 7C from the server unit 3 to perform processing for generating the snapshot 7D in the following manner.

The snapshot generating portion 201 generates, as the snapshot 7D, a file representing the current state of the MFP unit 2. To be specific, the snapshot generating portion 201 saves, to the auxiliary storage 20d, the programs and data loaded in the RAM 20b and the data stored in the register of the CPU 20a (encircled number 4). The snapshot generating portion 201 then makes a file of the programs and data (encircled number 5). The file corresponds to the snapshot 7D.

The snapshot transmission portion 202 sends the snapshot 7D to the server unit 3 (encircled number 6).

When the snapshot generating portion 306 generates the snapshot 7B, and further, when the MFP unit 2 sends the snapshot 7D, the snapshot save processing portion 308 correlates the two files with the name received by the save conditions receiving portion 305 and saves the resultant to the destination-to-save received by the save conditions receiving portion 305 (encircled number 7). In one or more embodiments, the correlating is performed by storing the two files into one folder given the name.

For example, if the name "March regular monthly meeting" is received and a box is received as the destination-to-save, then the snapshot save processing portion 308 generates a folder having the name of "March regular monthly meeting" to store the snapshot 7B and the snapshot 7D into the folder. The snapshot save processing portion 308 then sends the folder to the MFP unit 2. The snapshot save processing portion 308 also gives a command to the MFP unit 2 to save the folder to a box of the logged-in user of the server unit 3. The MFP unit 2 follows the command to save the snapshot 7B to the box.

Alternatively, if the name "March regular monthly meeting" is received and a USB memory is received as the destination-to-save, then the snapshot save processing portion 308 generates a folder in the same manner as described above to store the snapshot 7B and the snapshot 7D into the folder. The snapshot save processing portion 308 then writes the folder onto the USB memory connected to the external interface 30i.

Alternatively, if the name "March regular monthly meeting" is received and a cloud server is received as the destination-to-save, then the snapshot save processing portion 308 generates a folder in the same manner as described above to store the snapshot 7B and the snapshot 7D into the folder. The snapshot save processing portion 308 then sends the folder to the server 5B and gives a command to the server 5B to save the folder to a directory of the logged-in user of the server unit 3. The server 5B follows the command to save the folder to the directory.

The snapshot save processing portion 308 may compress the folder to generate one file (so-called compressed folder), and save the file to the destination-to-save.

After the snapshot 7B and the snapshot 7D are saved, another user is permitted to use the multifunction device 1. After the snapshot 7B and the snapshot 7D are saved, the meeting program 30P and the operation maintaining program 30Q may be finished. Alternatively, displaying the name entry screen 6H may be finished and the call command button 6B may be displayed again as shown in FIG. 8.

In order to resume the suspended meeting, the user starts the operation maintaining program 30Q, and then, performs the operation as discussed below. In such a case, starting the meeting program 30P is unnecessary.

The user touches the call command button 6B (see FIG. 8) to display the main screen 6C (see FIG. 9). The user then touches the resume button 6C2.

In response to the user operation, the meeting selection receiving portion 321 performs processing for receiving a selection of a meeting to be resumed by the user in the following manner.

In response to the resume button 6C2 touched, the meeting selection receiving portion 321 displays, instead of the call command button 6B, a location selection screen 6J in the touch-sensitive panel display 4 as shown in FIG. 16.

The user then selects, in the location selection screen 6J, a save location where the snapshot 7B and the snapshot 7D corresponding to the meeting to be resumed by touching a select button 6J1 corresponding to the save location. The meanings of "box", "USB memory", and "cloud server" are the same as those described earlier with reference to FIG. 13.

The meeting selection receiving portion 321 searches, in the save location selected by the user, for a folder where the snapshot 7B and the snapshot 7D are stored.

To be specific, if the user selects "box" as the save location, then the meeting selection receiving portion 321 searches for such a folder in a box of the user provided in the MFP unit 2. Alternatively, if the user selects "USB memory" as the save location, then the meeting selection receiving portion 321 searches for such a folder in the USB memory connected to the external interface 30i. Yet alternatively, if the user selects "cloud server" as the save location, then the meeting selection receiving portion 321 searches for such a folder in the directory of the user provided in the server 5B.

As shown in FIG. 17, the meeting selection receiving portion 321 displays, instead of the location selection screen 6J, the meeting selection screen 6K having select buttons 6K1 for the folders found out by the search in the touch-sensitive panel display 4. The user selects a meeting to be resumed by touching one of the select buttons 6K1 corresponding to the meeting.

The meeting selection receiving portion 321 recognizes the select button 6K1 touched by the user to receive the selection of the meeting to be resumed.

When the meeting selection receiving portion 321 receives the selection of the meeting to be resumed by the user, processing is performed to restore the state of the multifunction device 1 at a time when the meeting has been suspended, for example, as shown in FIG. 18.

The boot setting portion 322 obtains the snapshot 7B and the snapshot 7D for the meeting from the save location selected in the location selection screen 6J by the user (encircled number 1 of FIG. 18).

To be specific, if the user selects "box", then the boot setting portion 322 downloads the snapshot 7B and the snapshot 7D from the folder, corresponding to the meeting, of a box of the user provided in the MFP unit 2. Alternatively, if the user selects "USB memory", then the boot setting portion 322 reads out the snapshot 7B and the snapshot 7D from the folder, corresponding to the meeting, of the USB memory connected to the external interface 30i. Yet alternatively, if the user selects "cloud server", then the boot setting portion 322 downloads the snapshot 7B and the snapshot 7D from the directory, corresponding to the meeting, of the user provided in the server 5B.

The boot setting portion 322 then uses the obtained snapshot 7B to perform processing to enable quick boot such as Warp boot or Super Warp boot. For example, the boot setting portion 322 saves the snapshot 7B to the snapshot region of the auxiliary storage 30d or to a predetermined save location of a boot memory. The boot setting portion 322 then sets, as a boot mode, the quick boot in a boot loader (for example, Basic Input/Output System (BIOS) (encircled number 2).

The boot setting portion 322 then sends the obtained snapshot 7D to the MFP unit 2 together with boot settings command data 7E (encircled number 3).

With the MFP unit 2, the boot setting portion 203 receives the snapshot 7D and the boot settings command data 7E. The boot setting portion 203 uses the snapshot 7D to perform processing for enabling quick boot such as the Warp boot or the Super Warp boot. For example, the boot setting portion 203 saves the snapshot 7D to a snapshot region of the auxiliary storage 20d or a predetermined save location of a boot memory, and sets, as the boot mood, the quick boot in a boot loader (encircled number 4).

For reboot, the reboot portion 323 of the server unit 3 finishes the operating system of the server unit 3 and resets the power of the server unit 3. In response to this operation, the quick boot based on the snapshot 7B is performed (encircled number 5). Stated differently, the snapshot 7B is restored in the RAM 30b. This returns the state of the server unit 3 to the state thereof at a time when the meeting has been suspended.

In the same manner as described above, for reboot, the reboot portion 204 of the MFP unit 2 finishes the operating system of the MFP unit 2 and resets the power of the MFP unit 2. In response to this operation, the quick boot based on the snapshot 7D is performed. This returns the state of the MFP unit 2 to the state thereof at a time when the meeting has been suspended (encircled number 6). In other words, the snapshot 7D is restored in the RAM 20b.

In some cases, the user does not use the services of the MFP unit 2 at all during a meeting. In such a case, when the meeting is stopped temporarily and is resumed later, it is rarely necessary to return the state of the MFP unit 2 to the state thereof at a time when the meeting has been stopped temporarily.

In view of this, it is possible that the snapshot request portion 307 of the server unit 3 does not send the request data 7C to the MFP unit 2 if no log data 7A is stored in the log data storage portion 304. Stated differently, it is possible that the snapshot 7D of the MFP unit 2 is not generated.

In one or more embodiments, where no snapshot 7D is obtained from the save location, the boot setting portion 322 does not send the boot settings command data 7E to the MFP unit 2. This prevents the MFP unit 2 from rebooting.

Figure 19:
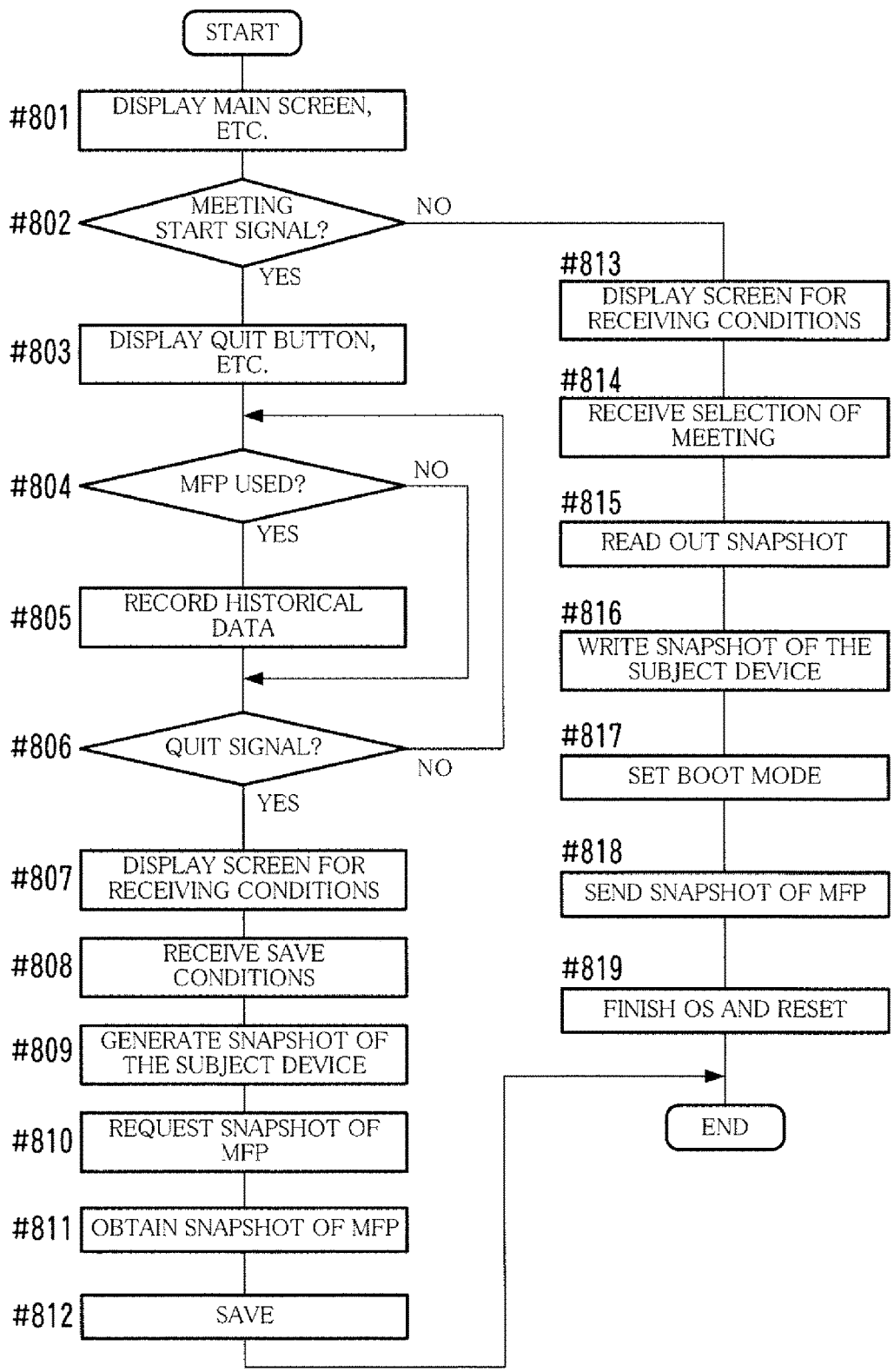
FIG. 19 is a flowchart depicting an example of the flow of the entire processing performed by a server unit.
Figure 20:
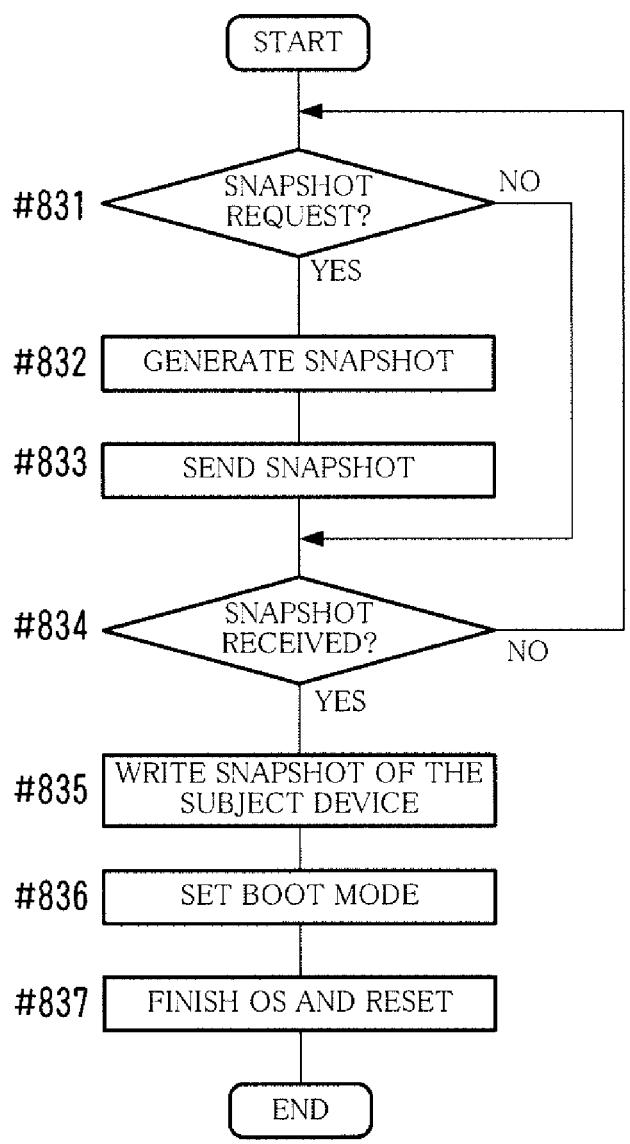
FIG. 20 is a flowchart depicting an example of the flow of the entire processing performed by an MFP unit.

FIG. 19 is a flowchart depicting an example of the flow of the entire processing performed by the server unit 3. FIG. 20 is a flowchart depicting an example of the flow of the entire processing performed by the MFP unit 2.

The description goes on to the flow of the entire processing performed by each of the MFP unit 2 and the server unit 3. The description is provided with reference to the flowcharts.

The server unit 3 performs the processing based on the operation maintaining program 30Q in the steps as depicted in FIG. 19.

The server unit 3 displays the call command button 6B in the touch-sensitive panel display 4 as shown in FIG. 8. In response to the call command button 6B touched, the server unit 3 displays the main screen 6C as shown in FIG. 9 (Step #801 of FIG. 19).

In order to start a new meeting, the user touches the new button 6C1. In response to the touch (YES in Step #802), the server unit 3 displays the operation list screen 6D as shown in FIG. 10. When the user then touches the meeting button 6D1, the server unit 3 displays the quit command button 6E1 and the save command button 6E2 as shown in FIG. 11 (Step #803). Every time the user uses the service of the MFP unit 2 (YES in Step #804), the server unit 3 stores data showing a record of use of the service as the log data 7A (Step #805).

In order to suspend the meeting, the user touches the quit command button 6E1. In response to the touch (YES in Step #806), the server unit 3 displays screens used to receive conditions relating to save of a snapshot as shown in FIGS. 12-14, namely, the save necessity selection screen 6F, the destination-to-save selection screen 6G, and the name entry screen 6H in order (Step #807).

The user selects a destination to save the snapshot and enters the name of the meeting. The server unit 3 receives the selected destination-to-save and the entered name (Step #808). The server unit 3 generates a snapshot 7B (Step #809), requests the MFP unit 2 to generate a snapshot 7D (Step #810), and obtains the snapshot 7D (Step #811).

The server unit 3 then correlates the snapshot 7B and the snapshot 7D with the received name, and then, saves the resultant to the received destination (Step #812).

In contrast, in order to resume the suspended meeting, the user touches the resume button 6C2 in the main screen 6C.

In response to the resume button 6C2 touched (NO in Step #802), the server unit 3 displays, as shown in FIGS. 16 and 17, in order, the screens used to receive the location to which the snapshot 7B and the snapshot 7D for the meeting are saved (save location) and to receive the name of the meeting, namely, the location selection screen 6J and the meeting selection screen 6K (Step #813).

The user selects a save location of the snapshots and a name of the meeting. The server unit 3 then receives the selected save location and the name of the meeting (Step #814). The server unit 3 then obtains the snapshot 7B and the snapshot 7D from the save location (Step #815).

In order for the quick boot to be performed based on the snapshot 7B, the server unit 3 saves the snapshot 7B to a predetermined save location (Step #816), and sets the boot mode at a quick boot mode (Step #817). The server unit 3 then sends the snapshot 7D and the boot settings command data 7E to the MFP unit 2 (Step #818).

The server unit 3 finishes the operating system and so on, and resets the power source (Step #819). The server unit 3 then starts rebooting by quick boot.

The MFP unit 2 performs the processing based on the snapshot program 20P in the steps depicted in FIG. 20.

The MFP unit 2 receives the request data 7C from the server unit 3 (YES in Step #831 of FIG. 20), generates the snapshot 7D (Step #832), and sends the snapshot 7D to the server unit 3(Step #833).

Alternatively, when receiving the snapshot 7D and the boot settings command data 7E from the server unit 3 (YES in Step #834), the MFP unit 2 saves the snapshot 7D to a predetermined save location (Step #835) so that the quick boot is performed based on the snapshot 7D, and sets the boot mode at the quick boot mode (Step #836).

The MFP unit 2 finishes the operating system, etc. and resets the power source (Step #837). The MFP unit 2 then starts rebooting by quick boot.

According to one or more embodiments, it is possible to bring a state of a multifunction device having two devices with separate systems, e.g., the multifunction device 1, back to a state of the multifunction device at a predetermined point in time, e.g., at a time when the meeting has been suspended, more easily than is conventionally possible.

Figure 21:
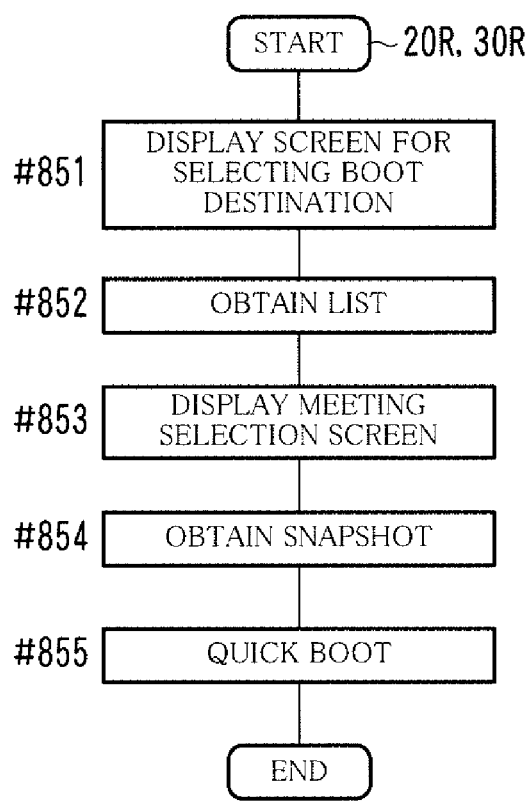
FIG. 21 is a flowchart depicting an example of the flow of startup processing by a boot program.
Figure 22:
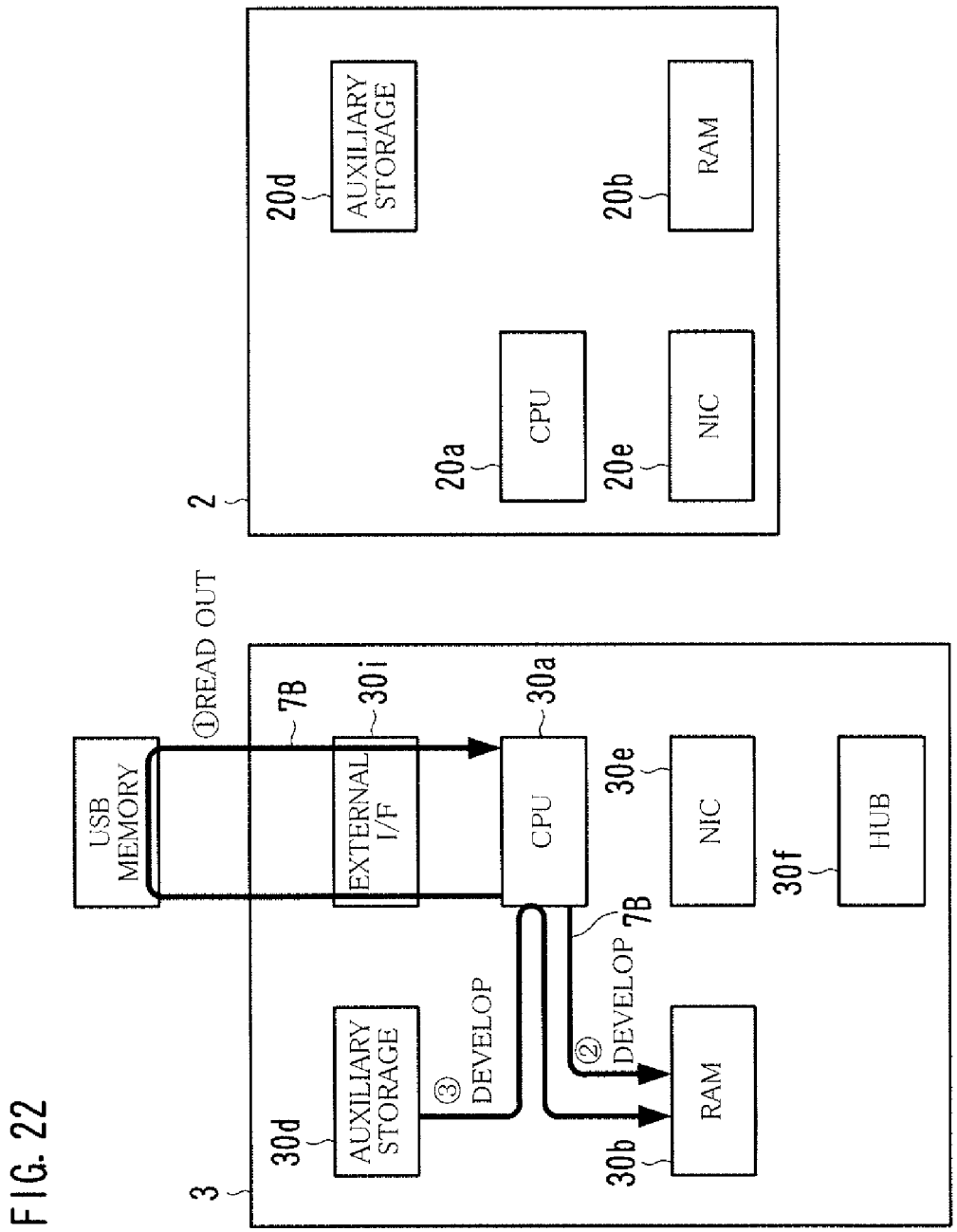
FIG. 22 is a diagram showing an example of the flow of data at a time when a server unit is rebooted.
Figure 23:
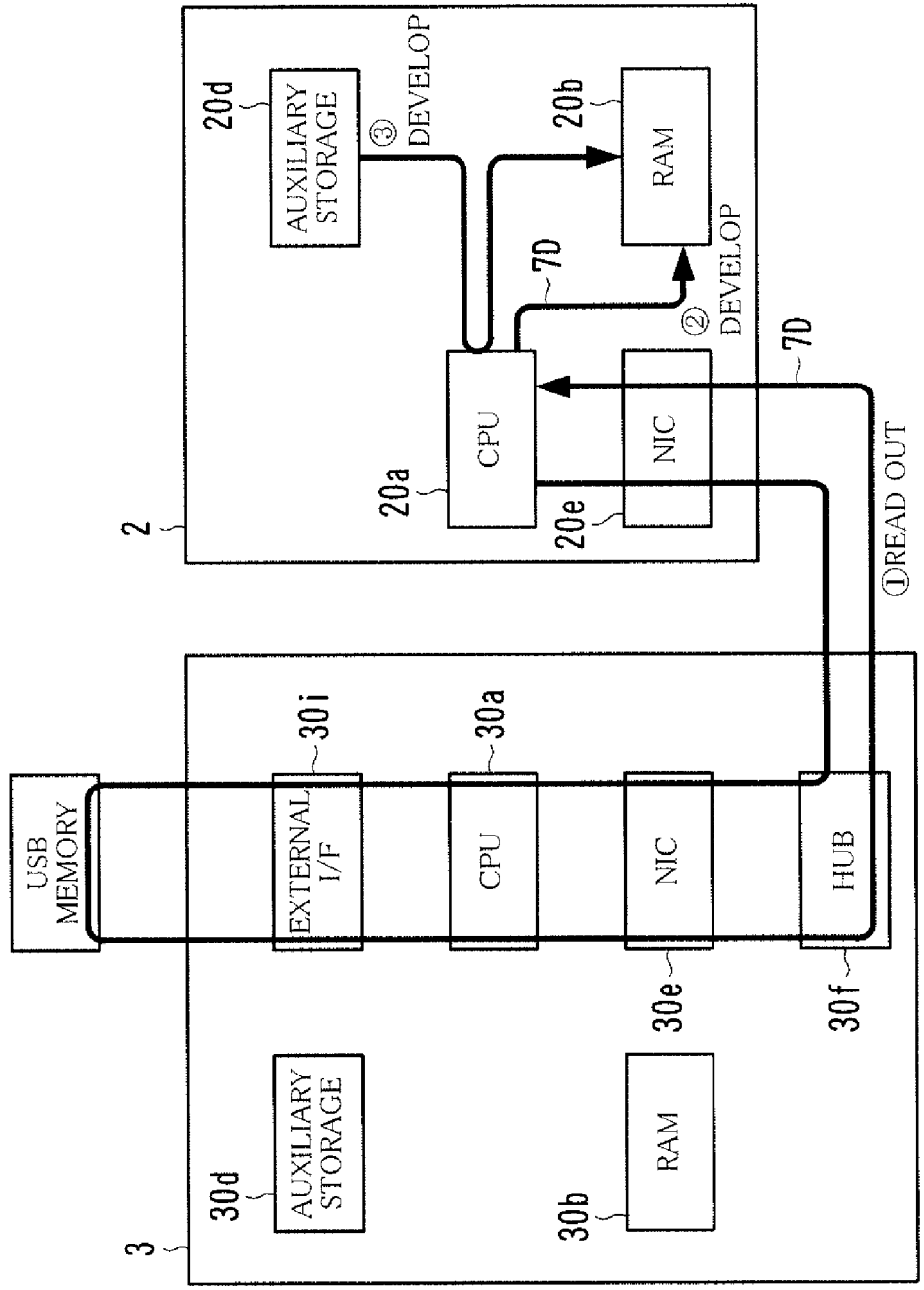
FIG. 23 is a diagram showing an example of the flow of data at a time when an MFP unit is rebooted.
Figure 24:
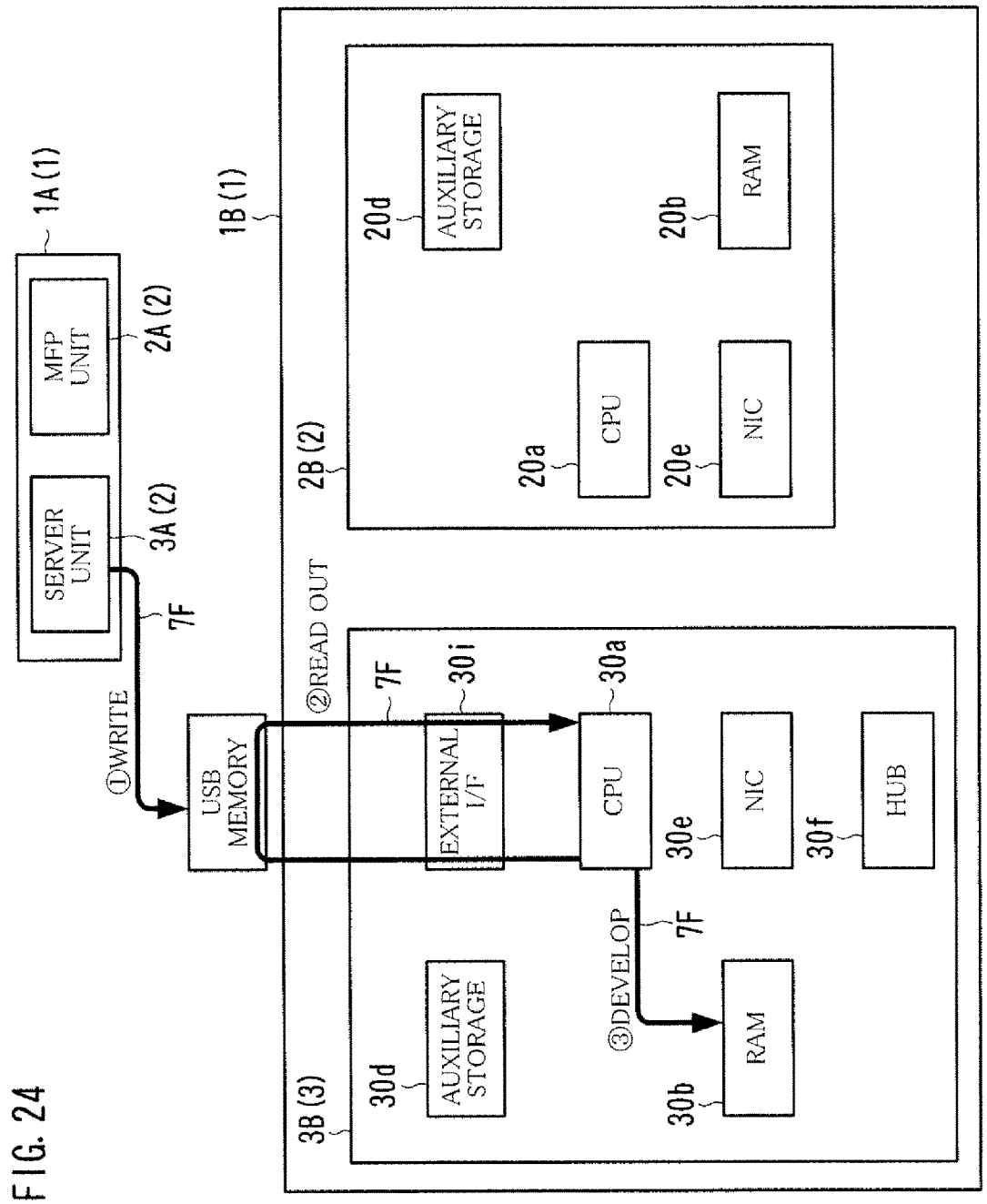
FIG. 24 is a diagram showing an example of a reboot method which involves using a snapshot of another server unit.
Figure 25:
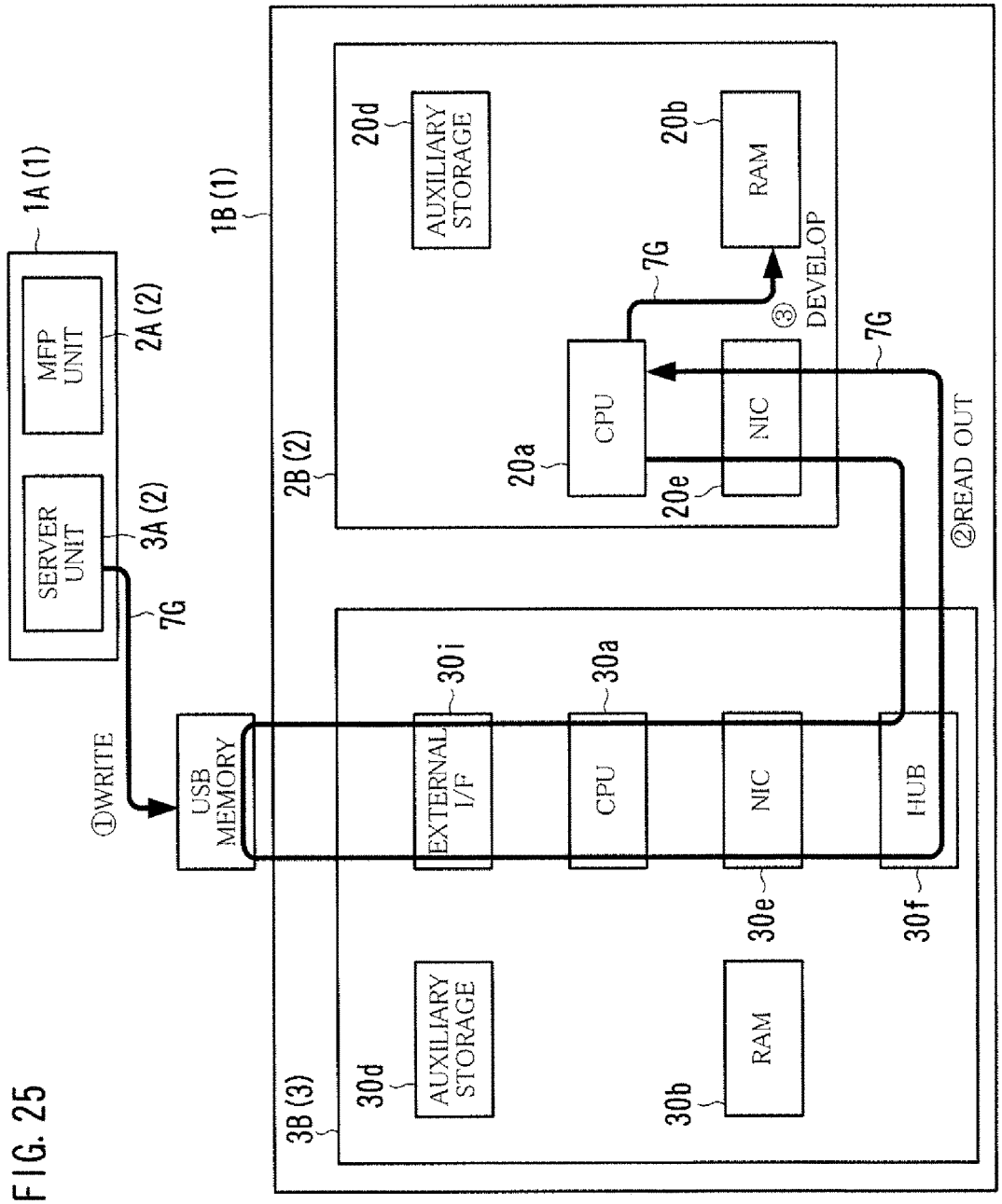
FIG. 25 is a diagram showing an example of a reboot method which involves using a snapshot of another MFP unit.

FIG. 21 is a flowchart depicting an example of the flow of startup processing by a boot program 20R or 30R. FIG. 22 is a diagram showing an example of the flow of data at a time when the server unit 3 is rebooted. FIG. 23 is a diagram showing an example of the flow of data at a time when the MFP unit 2 is rebooted. FIG. 24 is a diagram showing an example of a reboot method which involves using a snapshot of another server unit. FIG. 25 is a diagram showing an example of a reboot method which involves using a snapshot of another MFP unit.

In one or more embodiments, the operation maintaining program 30Q and the snapshot program 20P are used to make settings for quick boot. Instead of this, the boot loader of each of the server unit 3 and the MFP unit 2 may be used to make settings for quick boot in the following manner.

The boot loader 30R is stored, in advance, into the ROM 30c or the auxiliary storage 30d of the server unit 3 as the boot loader. The boot loader 20R is stored, in advance, into the ROM 20c or the auxiliary storage 20d of the MFP unit 2 as the boot loader.

When the server unit 3 is turned on or reset, the CPU 30a executes boot processing based on the boot loader 30R in a manner as depicted in FIG. 21.

The CPU 30a controls the touch-sensitive panel display 4 to display a screen for selecting a boot destination, namely, boot device (Step #851 of FIG. 21). The screen has a "box" button, a "USB memory" button, and a "cloud server" button as options of boot destination, as with the location selection screen 6J (see FIG. 16).

When the user selects any one of the boot destinations by touching a button corresponding thereto, the CPU 30a accesses the selected boot destination to obtain a list of snapshots (Step #852). The CPU 30a then controls the touch-sensitive panel display 4 to display a screen for selecting a snapshot based on the obtained list (Step #853). As with the meeting selection screen 6K (see FIG. 17), the screen has buttons for meetings.

When the user selects a meeting to be resumed by touching a button corresponding to the meeting to be resumed, the CPU 30a obtains the snapshot 7B for the meeting from the selected boot destination (Step #854), and performs quick boot by developing/loading the snapshot 7B on/into the RAM 30b (Step #855).

For example, where the user selects a USB memory as the boot destination and selects any one of the meetings, the server unit 3 performs boot processing as shown in FIG. 22.

The CPU 30a retrieves the snapshot 7B for the selected meeting from the USB memory connected to the external interface 30i (encircled number 1). The CPU 30a develops the snapshot 7B on the RAM 30b (encircled number 2).

When the MFP unit 2 is turned on or reset, the CPU 20a performs the boot processing based on the boot loader 20R. The steps of the processing are basically the same as those of the boot processing based on the boot loader 20R as depicted in FIG. 21.

For example, where the user selects a USB memory as the boot destination and selects any one of the meetings, the MFP unit 2 performs the boot processing as shown in FIG. 23.

The CPU 20a accesses the server unit 3 via the NIC 20e to retrieve the snapshot 7D for the selected meeting from the USB memory connected to the external interface 30i (encircled number 1). The CPU 20a then develops the snapshot 7D on the RAM 20b (encircled number 2).

Meanwhile, after the quick boot, in each of the MFP unit 2 and the server unit 3, the boot destination is changed from the box, the USB memory, or the cloud server to the default save location, e.g., a predetermined folder of each of the auxiliary storage 20d or the auxiliary storage 30d. Settings are then made so that the default files saved in the save location are used as snapshots.

Accordingly, when quick boot is performed not in order to resume a meeting, the snapshots stored in each of the default save locations are developed on the RAM 20*b* or the RAM 30*b* (encircled number 3 of FIG. 22 and encircled number 3 of FIG. 23).

In one or more embodiments, the MFP unit 2 uses the snapshot 7D for reboot. The snapshot 7D is generated by the subject MFP unit 2. Likewise, the server unit 3 uses the snapshot 7B for reboot. The snapshot 7B is generated by the subject server unit 3.

Instead of this, however, the MFP unit 2 may reboot by using a snapshot generated by another MFP unit. Likewise, the server unit 3 may reboot by using a snapshot generated by another server unit.

Hereinafter, reboot processing based on a snapshot generated by another unit is described with reference to FIGS. 24, 25, and so on. The description is provided by taking an example where the MFP unit 2A and the server unit 3A of the multifunction device 1A use respectively a snapshot generated by a MFP unit 2B of a multifunction device 1B and a snapshot generated by a server unit 3B of the multifunction device 1B.

The server unit 3A performs the processing of Step #801 through Step #811 of FIG. 19. Thereby, the server unit 3A generates a snapshot of the subject server unit 3A (hereinafter, referred to as a "snapshot 7F"), and causes the MFP unit 2A to generate a snapshot of the MFP unit 2A (hereinafter, referred to as a "snapshot 7G").

The server unit 3A then saves, in Step #812, the snapshot 7F and the snapshot 7G to one of the USB memory and the cloud server selected by the user (encircled number 1 of FIG. 24 and encircled number 1 of FIG. 25). The case where the snapshot 7F and the snapshot 7G are saved to a USB memory is described below.

The user removes the USB memory from the server unit 3A and inserts the USB memory into the server unit 3B. The user then performs operation as described above to select the USB memory as a destination-to-save of the snapshot and also to select a name of a meeting corresponding to the snapshot 7F and the snapshot 7G.

The server unit 3B may be so configured that the name of the meeting corresponding to the snapshot 7F is displayed when the server unit 3B is compatible with the server unit 3A; and the name is not displayed when the server unit 3B is not compatible with the server unit 3A. Stated differently, the server unit 3B may be so configured that the snapshot 7F is selectable only when the server unit 3B is compatible with the server unit 3A.

For example, the server unit 3B is so configured that the snapshot 7F is selectable only when the CPU 30*a* of the server unit 3B is the same product as the CPU 30*a* of the server unit 3A. Alternatively, the server unit 3B is so configured that the snapshot 7F is selectable only when the CPU 30*a* of the server unit 3B is upward compatible with the CPU 30*a* of the server unit 3A. Likewise, a configuration is possible in which the snapshot 7G is selectable only when the CPU 20*a* of the MFP unit 2B is the same product as the CPU 20*a* of the MFP unit 2A, alternatively, only when the CPU 20*a* of the MFP unit 2B is upward compatible with the CPU 20*a* of the server unit 2A.

With the server unit 3B, the CPU 30*a* retrieves the snapshot 7F based on the selected name from the selected destination-to-save, namely, the USB memory (encircled number 2 of FIG. 24), and develops the snapshot 7F on the RAM 30*b* of the server unit 3B (encircled number 3).

Alternatively, the CPU 30*a* may save the snapshot 7F temporarily to the auxiliary storage 30*d*, set the boot mode at the quick mode, and then develop the snapshot 7F on the RAM 30*b*.

Similarly, the CPU 20*a* of the MFP unit 2B retrieves the snapshot 7G based on the selected name from the selected destination-to-save, namely, the USB memory, (encircled number 2 of FIG. 25), and develops the snapshot 7G on the RAM 20*b* of the subject MFP unit 2B (encircled number 3). Alternatively, the CPU 20*a* may temporarily save the snapshot 7G to the auxiliary storage 20*d*, set the boot mode at the quick mode, and then develop the snapshot 7G on the RAM 20*b*.

Thereafter, a network setting portion of each of the MFP unit 2B and the server unit 3B turns off the network function temporarily, and sets again the individual set values for network, e.g., an IP address of the subject device and an IP address of the default gateway, depending on a set value corresponding to the subject device. The network setting portion of each of the MFP unit 2B and the server unit 3B then turns on the network function.

In one or more embodiments, the state of each of the RAM 20*b* and the RAM 30*b* is restored. Another configuration is possible where a file that is used in a meeting and is saved to the auxiliary storage 30*d* or the auxiliary storage 20*d* is also restored. For example, when a meeting is suspended, the server unit 3 saves a file used in the meeting to a destination-to-save selected by the user. After reboot, where the file is already deleted from the auxiliary storage 30*d* or the auxiliary storage 20*d*, the server unit 3 retrieves the file from the destination-to-save to restore the file in the auxiliary storage 30*d* or the auxiliary storage 20*d*.

Where the destination-to-save is a cloud server (server 5B), the user may be verified by undergoing biometric authentication, e.g., fingerprint authentication or pulse wave authentication. In one or more embodiments, when the user of the multifunction device 1 is successfully authenticated via biometric authentication, the cloud server sends, to the multifunction device 1, the snapshot 7B and the snapshot 7D saved in the directory of the user.

Another configuration is also possible. To be specific, where the multifunction device 1 is operated by an administrator, he/she may select the snapshot 7B and the snapshot 7D saved in a directory or a box of any user of the multifunction device 1.

It is to be understood that the overall configuration of the multifunction device 1, the MFP unit 2, and the server unit 3, the constituent elements thereof, the content of the processing, the order of the processing, the configuration of the screens, and the like may be appropriately modified without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A multifunction device integrally comprising:
   a first device; and
   a second device, wherein
   the first device has a first system, and the second system has a second system separately from the first system,
   the second device comprises a second transmitter that requests, in response to a predetermined command, a first snapshot of the first device from the first device,
   the first device comprises:

a first computing unit that generates the first snapshot in response to a request from the second device; and a first transmitter that sends the first snapshot generated by the first computing unit to the second device, the second device further comprises:

a second computing unit that generates a second snapshot of the second device in response to the predetermined command; and a save processing portion that saves, to a save destination, the first snapshot sent from the first device and the second snapshot generated by the second computing unit, the first device further comprises a first boot loader that starts the first system by using the first snapshot saved in the save destination, and the second device further comprises a second boot loader that starts the second system by using the second snapshot saved in the save destination.

2. The multifunction device according to claim 1, wherein the first device is an image forming apparatus, and the second device is an embedded computer built into a casing of the image forming apparatus.

3. The multifunction device according to claim 1, wherein the first device further comprises a first Random Access Memory (RAM), the second device further comprises a second RAM, the first boot loader starts the first system by developing the first snapshot on the first RAM, and the second boot loader starts the second system by developing the second snapshot on the second RAM.

4. The multifunction device according to claim 1, wherein the second device further comprises a recorder that records a use of the first device by a user, and when the recorder records a use of the first device by the user, the second transmitter does not request the first snapshot, the save processing portion saves only the second snapshot, and the first boot loader starts the first system without using the first snapshot.

5. The multifunction device according to claim 1, wherein the save destination is any one of a portable recording medium externally provided to the second device, a storage built into the first device, and a server connected via a communication line to the multifunction device.

6. A reboot method used in a multifunction device integrally comprising a first device and a second device, the first device having a first system, the second system having a second system separately from the first system, the method comprising:

requesting, by the second device, in response to a predetermined command, a first snapshot of the first device from the first device;

generating, by the first device, the first snapshot in response to a request from the second device;

sending, by the first device, the first snapshot to the second device;

generating, by the second device, a second snapshot of the second device in response to the predetermined command;

saving, by the second device, to a save destination, the first snapshot and the second snapshot;

starting, by the first device, the first system by using the first snapshot saved in the save destination; and starting, by the second device, the second system by using the second snapshot saved in the save destination.

\* \* \* \* \*